(12) United States Patent
Xiang et al.

(10) Patent No.: US 7,749,943 B2
(45) Date of Patent: Jul. 6, 2010

(54) METHOD AND DRILLING FLUID SYSTEMS AND LOST CIRCULATION PILLS ADAPTED TO MAINTAIN THE PARTICLE SIZE DISTRIBUTION OF COMPONENT LATEX PARTICLES BEFORE AND AFTER FREEZING OF THE LATEX PARTICLES IN THE PRESENCE OF WATER

(75) Inventors: Tao Xiang, Cypress, TX (US); Dennis K. Clapper, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 747 days.

(21) Appl. No.: 11/284,163

(22) Filed: Nov. 21, 2005

(65) Prior Publication Data

US 2006/0116294 A1 Jun. 1, 2006

Related U.S. Application Data

(60) Provisional application No. 60/632,090, filed on Dec. 1, 2004.

(51) Int. Cl.
*C09K 8/24* (2006.01)
*E21B 7/00* (2006.01)

(52) U.S. Cl. ............................ 507/122; 175/65; 175/72; 507/117; 507/119; 507/125; 507/136; 507/139; 516/77

(58) Field of Classification Search ................. 507/122, 507/117, 119, 125, 136, 139; 175/65, 72; 516/77
See application file for complete search history.

(56) References Cited

U.S. PATENT DOCUMENTS

| | | | |
|---|---|---|---|
| 2,809,179 A | 10/1957 | Endres et al. | |
| 3,724,547 A | 4/1973 | Bott et al. | |
| 3,730,271 A | 5/1973 | Gall | |
| 3,780,806 A | 12/1973 | Bott | |
| 3,799,969 A | 3/1974 | Hoppe | |
| 4,436,636 A | 3/1984 | Carnicom | |
| 4,458,050 A | 7/1984 | Heyman | |
| 4,486,316 A | 12/1984 | Carriere et al. | |
| 4,525,522 A | 6/1985 | Turner et al. | |
| 4,670,501 A * | 6/1987 | Dymond et al. ............. 524/458 |
| 4,671,883 A | 6/1987 | Connell et al. | |
| 4,740,319 A | 4/1988 | Patel et al. | |
| 5,164,433 A | 11/1992 | Ricci et al. | |
| 5,346,011 A | 9/1994 | Onan et al. | |
| 5,372,641 A | 12/1994 | Carpenter | |
| 5,425,806 A * | 6/1995 | Doolan et al. ............. 106/203.1 |
| 5,605,872 A | 2/1997 | Engel et al. | |
| 5,837,655 A | 11/1998 | Halliday et al. | |
| 5,851,958 A | 12/1998 | Halliday et al. | |
| 5,913,364 A | 6/1999 | Sweatman | |
| 6,167,967 B1 | 1/2001 | Sweatman | |
| 6,184,287 B1 * | 2/2001 | Westerman ................. 524/814 |
| 6,197,878 B1 | 3/2001 | Murray et al. | |
| 6,234,251 B1 | 5/2001 | Chatterji et al. | |
| 6,328,106 B1 | 12/2001 | Griffith et al. | |
| 6,401,817 B1 | 6/2002 | Griffith et al. | |
| 6,508,306 B1 | 1/2003 | Reddy et al. | |
| 6,703,351 B2 | 3/2004 | Stowe, II et al. | |
| 6,881,708 B2 | 4/2005 | Reddy et al. | |
| 2002/0160919 A1 | 10/2002 | Stowe, II et al. | |
| 2004/0063807 A1 | 4/2004 | Wang et al. | |
| 2004/0110644 A1 | 6/2004 | Halliday et al. | |
| 2004/0132625 A1 | 7/2004 | Halliday et al. | |

FOREIGN PATENT DOCUMENTS

| | | |
|---|---|---|
| EP | 0 175 412 A2 | 3/1988 |
| GB | 2074636 A | 11/1981 |
| GB | 2131067 A | 6/1984 |
| GB | 2304754 A | 3/1997 |
| GB | 2351986 A | 1/2001 |
| WO | WO 93/09201 | 5/1993 |

OTHER PUBLICATIONS

C. Stowe, et al., "Laboratory Pore Pressure Transmission Testing of Shale" AADE National Drilling Technical Conference, 2001, pp. 1-10, AADE 01-NC-HO-44.
British Combined Search and Examination Report for United Kingdom Patent Application No. GB 0114390.8, Oct. 15, 2001.

* cited by examiner

*Primary Examiner*—Timothy J. Kugel
(74) *Attorney, Agent, or Firm*—The Morris Law Firm, P.C.; Paula D. Morris

(57) ABSTRACT

Latex additives, methods for treating latex additives, drilling fluid systems, and lost circulation pills comprising the latex additives, the latex additive comprising latex particles having a particle size distribution before aging comprising an average particle diameter of about 1 micron or less; and a quantity of one or more water soluble oxygenated organic molecules comprising two or more oxygen atoms effective to maintain substantially the same particle size distribution before and after freezing the latex additive.

56 Claims, 19 Drawing Sheets

METHOD AND DRILLING FLUID SYSTEMS AND LOST CIRCULATION PILLS ADAPTED TO MAINTAIN THE PARTICLE SIZE DISTRIBUTION OF COMPONENT LATEX PARTICLES BEFORE AND AFTER FREEZING OF THE LATEX PARTICLES IN THE PRESENCE OF WATER

The present application claims the benefit of U.S. Provisional Patent Application Ser. No. 60/632,090, filed Dec. 1, 2004, expired.

FIELD OF THE APPLICATION

The present application relates to latex additives, methods for treating latex additives, and methods for using latex additives.

BACKGROUND

Latex additive(s) are useful in drilling fluid systems. Unfortunately, latex particles exposed to water are susceptible to damage at temperatures close to or below the freezing point of water. Methods and products are needed to reduce damage to latex particles exposed to water at low temperatures.

BRIEF SUMMARY

The present application provides a latex additive comprising latex particles and a quantity of one or more one or more water soluble antifreeze agent.

The present application provides a latex additive comprising latex particles having a particle size distribution before aging comprising an average particle diameter of about 1 micron or less and a quantity of one or more water soluble oxygenated organic molecules comprising two or more oxygen atoms effective to maintain substantially the same particle size distribution after freezing the latex additive.

The present application also provides a latex additive comprising an aqueous solution comprising: from about 10 wt. % to about 70 wt. % latex particles having a particle size distribution before aging comprising an average particle diameter of about 1 micron or less; and, from about 10 to about 25 wt. % of one or more water soluble oxygenated organic molecules comprising two or more oxygen atoms selected from the group consisting of glycerol, glycols, and alcohol ethers having the following structure:

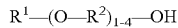

$R^1$—(O—$R^2$)$_{1-4}$—OH wherein $R^1$ and $R^2$ independently are selected from the group consisting of alkyl groups having from about 1 to about 3 carbon atoms.

The present application also provides a method for treating a latex additive comprising latex particles having a particle size distribution before freezing, the method comprising providing the latex additive with a quantity of one or more water soluble oxygenated organic molecules comprising two or more oxygen atoms effective to produce substantially the same particle size distribution after freezing in the presence of water.

DETAILED DESCRIPTION

Figure 1:
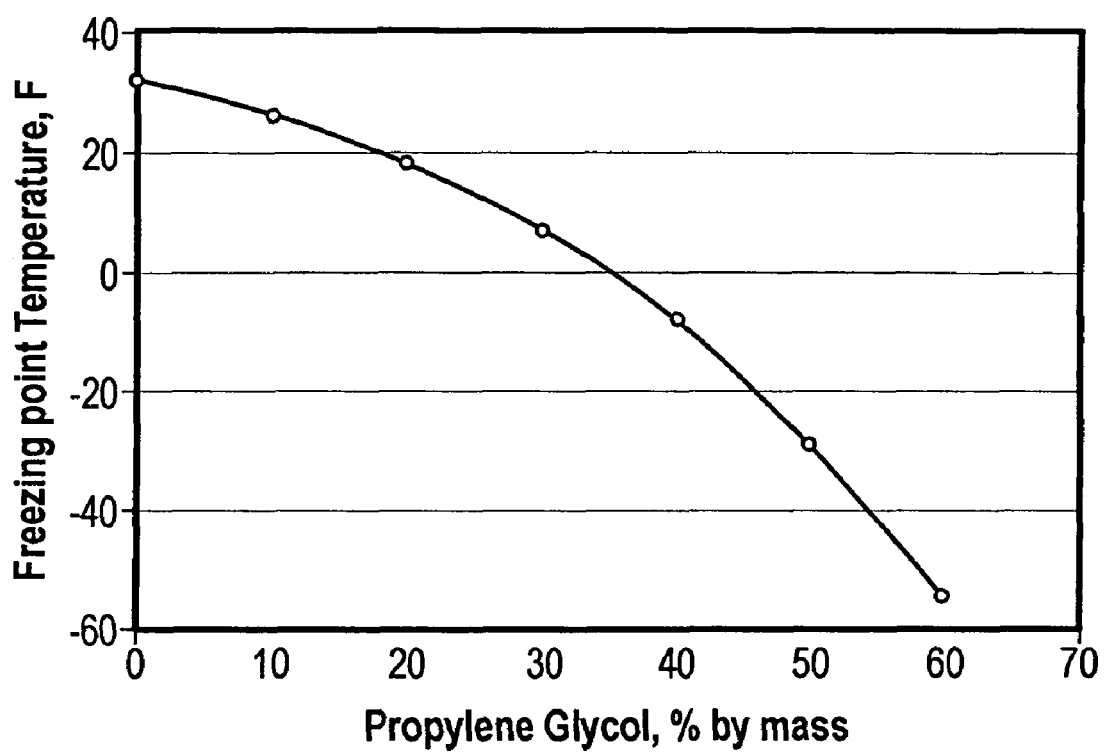
FIG. 1 is a graph of the freezing point of propylene glycol based water solutions from the Table in Example 1.

Latex additives are used in a variety of environments which may involve exposure to water at low temperature. One such environment is a drilling fluid system comprising latex particles. Temperatures well below the freezing point of water (0° C./32° F.) occur at drilling sites. In the presence of water and freezing temperatures, latex particles are susceptible to damage.

The present application provides a latex additive and a method for treating a composition comprising latex particles to reduce damage to the latex particles due to freezing. In one embodiment, the latex additive comprises or is treated with one or more water soluble oxygenated organic molecules. In one embodiment, the latex additive is used in a "drilling fluid system." The phrase "drilling fluid system" includes, but is not necessarily limited to "drilling" fluids, "drill-in" fluids, "completion" fluids, "workover" fluids, and "lost circulation" pills.

An important quality of drilling fluid systems comprising latex particles is the ability of the small, deformable latex particles to maintain borehole stability by sealing/plugging the pores in the borehole. The latex particles suitably have a particle size distribution before aging comprising an average particle diameter of about one micron or less. In one embodiment, the particle size distribution before aging comprises an average particle diameter of less than one micron. When latex freezes in the presence of water, the particle size distribution of the latex particles generally shifts, resulting in latex particles having a relatively larger particle size distribution. The relatively larger latex particles are not as effective at sealing/plugging the borehole. If fluids comprising latex particles are exposed to temperatures below the freezing point of water (0° C./32° F.) in the presence of water, the latex particles may freeze and be permanently damaged. Both laboratory and field experience has proven that such damage occurs to the nano-sized latex particles in MAX-SHIELD® at such temperatures, resulting in larger particles or flocculation. The increase in particle size reduces the performance of the latex additive as a sealing agent.

The present application provides a method for treating latex additives comprising providing the latex additive with a quantity of antifreeze additive. Suitable antifreeze additives include, for example, one or more water soluble oxygenated organic molecules. In one embodiment, the one or more water soluble oxygenated organic molecules comprises two or more oxygen atoms. Examples of suitable water soluble oxygenated organic molecules include, for example, multihydric alcohols and alcohol ethers. In one embodiment, the alcohol ethers comprise one or more ether moiety.

The one or more oxygenated organic molecules reduce the impact of freezing on the latex additive. Experimental results have indicated that the addition of one or more oxygenated organic molecules to aqueous latex additive not only can lower the freezing point of the latex additive, but also can protect the nano-sized particles from freeze damage. The protection is evidenced by maintaining substantially the same latex particle size distribution before and after freezing of the latex additive.

The latex additive suitably comprises the latex particles at about 10 wt. % or more, based on the total weight of the latex additive. In one embodiment, the latex additive comprises from about 10 wt. % to about 70 wt. % latex particles, based on the total weight of the latex additive. In one embodiment, the latex additive comprises about 40 wt. % latex particles, based on the total weight of the latex additive.

The latex additive comprises a suspension of latex particles in a base liquid. The base liquid may be any liquid which is compatible with the substrate to be treated. In one embodiment, the base liquid is water, which may or may not comprise salt. In one embodiment, the latex additive comprises water at about 30 wt. % or more. In one embodiment, the latex additive comprises from about 30 wt. % to about 90 wt. % water. In another embodiment, the latex additive comprises about 60 wt. %. In one embodiment, the water is fresh water.

Suitable water soluble oxygenated organic molecules for use in the latex additive maintain substantially the same latex particle size distribution before and after freezing of the latex additive in the presence of water. The one or more oxygenated organic molecules also suitably reduce the freezing point of the latex additive.

Suitable water soluble oxygenated organic molecules for use in the latex additive include, but are not necessarily limited to water soluble oxygenated organic molecules having a weight average molecular weight of about 800 or less. In one embodiment, the water soluble oxygenated organic molecules have a weight average molecular weight of about 200 or less. Suitable water soluble oxygenated organic molecules have from 2 to 7 carbon atoms. In one embodiment, the water soluble oxygenated organic molecules have from 2 to 3 carbon atoms.

In one embodiment, the one or more oxygenated organic molecules comprise water soluble multihydric alcohols. Examples of suitable water soluble multihydric alcohols include, but are not necessarily limited to propylene glycol, ethylene glycol, 1,3 butylene glycol, hexylene glycol, diethylene glycol, and glycerol. In one embodiment, the multihydric alcohols include, but are not necessarily limited to propylene glycol, ethylene glycol, glycerol, and combinations thereof.

In another embodiment, the water soluble organic molecules are alcohol ethers. Examples of suitable alcohol ethers include, for example, those having the following general structure:

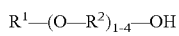

$$R^1-(O-R^2)_{1-4}-OH$$

wherein $R^1$ and $R^2$ independently are selected from the group consisting of alkyl groups having from about 1 to about 3 carbon atoms.

The quantity of one or more oxygenated organic molecules in the latex additive may be any quantity sufficient to maintain substantially the same latex particle size distribution before and after freezing of the latex additive. A suitable quantity of the one or more oxygenated organic molecules generally is about 5 wt. % or more, based on the total weight of a latex additive comprising water, latex particles, and the one or more oxygenated organic molecules. In one embodiment, the quantity of one or more oxygenated organic molecules is from about 5 wt. % to about 40 wt. %, based on the total weight of a latex additive. In one embodiment, the one or more oxygenated organic molecules is about 10 wt. %, based on the total weight of the latex additive. In another embodiment, the quantity of one or more oxygenated organic molecules is from about 10 wt. % to about 25 wt. %, based on the total weight of a latex additive. Expressed another way, the one or more oxygenated organic molecules generally is about 7 wt. % or more, suitably from about 7 wt. % to about 57 wt. %, suitably from about 14 wt. % to about 36 wt. % of the water phase of an aqueous latex additive. The one or more oxygenated organic molecules may be used to treat substantially any latex additive(s).

Suitable latex additives comprise latex particles having a particle size distribution in aqueous solution, before aging, comprising an average particle diameter of about 1 micron or less. In this embodiment, the latex particles typically have an average particle diameter before aging of from about 0.2 microns to about 1 micron. In one embodiment, the latex particles have a particle size distribution in aqueous solution comprising an average particle diameter of about 0.5 microns or less. In this embodiment, the latex particles typically have particle diameters before aging of from about 0.05 microns to about 0.5 microns and an average particle diameter of about 0.25 microns.

In one embodiment, 90 vol. % or more of the latex particles have a diameter of 1 micron or less before aging, and 90% or more of the latex particles have a diameter of 37 microns or smaller after aging at 65.6° C. (150° F.) for 16 hours, as measured using a Malvern Mastersizer Particle Size Analyzer in a solution of sodium chloride. In one embodiment, 90 vol. % or more of the latex particles have a diameter of less than 1 micron, before aging, and 90% or more of the latex particles have a diameter of smaller than 37 microns, after aging at 65.6° C. (150° F.) for 16 hours, as measured by a Malvern Mastersizer Particle Size Analyzer in a solution of sodium chloride. The foregoing are sometimes referred to as "D90" or "D90 size standards."

In one embodiment, the latex additive comprises sulfonated styrene/butadiene copolymers. Suitable sulfonated styrene/butadiene copolymers include, but are not necessarily limited to MAX-SHIELD®, available from Baker Hughes Drilling Fluids.

Suitable latexes for use in the latex additives include, but are not necessarily limited to sulfonated styrene/butadiene copolymers, carboxylated styrene/butadiene copolymers, polymethyl methacrylate, polyethylene, polyvinylacetate copolymer, polyvinyl acetate/vinyl chloride/ethylene copolymer, polyvinyl acetate/ethylene copolymer, natural latex, polyisoprene, polydimethylsiloxane, and combinations thereof. A somewhat less suitable latex is polyvinylacetate copolymer, more specifically, an ethylenevinyl chloride vinylacetate copolymer.

When used in a drilling fluid system, the drilling fluid system generally comprises from about 0.1 vol. % to about 10 vol. % latex additive, based on the total volume of the drilling fluid system. In one embodiment, the drilling fluid system comprises from about 1 vol. % to about 8 vol. % latex additive. In another embodiment, the drilling fluid system comprises from about 2 vol. % to about 5 vol. % latex additive, based on the total volume of the drilling fluid system.

The latex additive may be used in a water-based or in an oil-based drilling fluid system. The phrase "water-based" includes any drilling fluid system comprising water or a water-based solution as the continuous phase, including oil-in-water and oil-in-brine emulsions. The phrase "oil-based" includes system fluids comprising an organic material as a continuous phase, including water-in-oil and brine-in-oil emulsions, also sometimes called "invert emulsions."

Examples of suitable organic materials for the "oil" of such fluids include but are not necessarily limited to olefins, paraffins, water insoluble polyglycols, water insoluble esters, diesel, water insoluble Fischer-Tropsch reaction products, and other organic materials, suitably materials that are non-toxic at the concentrations used, and combinations thereof. Suitable olefins are branched and/or linear and suitably are relatively non-toxic synthetic olefins. Examples of suitable olefins include but are not necessarily limited to polyalphaolefins, linear alpha olefins, and internal olefins, typically skeletally isomerized olefins. In one embodiment, the olefins are described in U.S. Pat. Nos. 5,605,872 and 5,851,958, incorporated herein by reference. Suitable paraffins are described in U.S. Pat. No. 5,837,655, incorporated herein by reference.

The "oil" and other components used in the system fluid suitably are non-toxic. As used herein, the term "non-toxic" is defined to mean that a material meets the applicable EPA requirements for discharge into U.S. waters. Currently, a drilling fluid must have an $LC_{50}$ (lethal concentration where 50% of the organisms are killed) of 30,000 parts per million (ppm) suspended particulate phase (SPP) or higher to meet the EPA standards. Suitable system fluids meet relevant environmental standards in the location of the operation.

In order to be effective for use during drilling operations, the drilling fluid system has effective rheology, lubricity, and fluid loss control properties. Viscosity suitably is controlled by adding certain polymers to the fluid. The system fluid suitably contains polymers that are capable of viscosifying the drilling fluid system and/or providing filtration control for the drilling fluid system. Suitable polymers are non-toxic and will depend upon the base fluid. Suitable polymers include, but are not necessarily limited to water soluble starches and modified versions thereof, water soluble polysaccharides and modified versions thereof, water soluble celluloses and modified versions thereof, and water soluble polyacrylamides and copolymers thereof. Generally, the quantity of polymer used is about 2.86 kg/m$^3$ (1 lb/bbl). or more. In one embodiment, the quantity of polymer used is about 20 kg/m$^3$ (7 lb/bbl). or more.

Starches that are suitable for use in the system fluids include, but are not necessarily limited to corn based and potato based starches, suitable starches being more temperature stable starches. Polysaccharides that are suitable for use in the system fluids include, but are not necessarily limited to xanthan polysaccharides, wellan polysaccharides, scleroglucan polysaccharides, and guar polysaccharides. Celluloses that are suitable for use in the system fluids include, but are not necessarily limited to hydrophobically modified hydroxyethyl celluloses. Suitable copolymers of acrylamide include copolymers with acrylate monomers, hydrophobic N-isopropylacrylamide, and the like.

As used herein, the terms "modified starches" and "modified polysaccharides" or "synthetically modified polysaccharides" refer to starches and polysaccharides that have been chemically modified in a manner that renders them inherently non-fermentable in order to avoid the need for a preservative. Water-soluble "modified starches" and "modified polysaccharides" that should operate successfully as water-soluble polymers include, but are not necessarily limited to: hydroxyalkyl starches and polysaccharides; starch and polysaccharide esters; cross-link starches and polysaccharides; hypochlorite oxidized starches and polysaccharides; starch and polysaccharide phosphate monoesters; cationic starches and polysaccharides; starch and polysaccharide xanthates; and, dialdehyde starches and polysaccharides. These derivatized starches and polysaccharides can be manufactured using known means, such as those set forth in detail in Chapter X of *Starch: Chemistry and Technology* 311-388 (Roy L. Whistler, et al. eds., 1984), incorporated herein by reference.

Specific examples of suitable modified starches and modified polysaccharides include, but are not necessarily limited to: carboxymethyl starches and polysaccharides; hydroxyethyl starches and polysaccharides; hydroxypropyl starches and polysaccharides; hydroxybutyl starches and polysaccharides; carboxymethylhydroxyethyl starches and polysaccharides; carboxymethylhydroxypropyl starches and polysaccharides; carboxymethylhydroxybutyl starches and polysaccharides; epichlorohydrin starches and polysaccharides; alkylene glycol modified starches and polysaccharides; and, other starch and polysaccharide copolymers having similar characteristics. Suitable modified starches and/or modified polysaccharides comprise a functional group selected from the group consisting of a carboxymethyl group, a propylene glycol group, and an epichlorohydrin group.

Where the system fluid is water-based, suitable viscosifiers and filtration control agents are polysaccharides, including but not necessarily limited to XANPLEX® D, BIO-PAQ® and/or BIO-LOSE™, all of which are commercially available from Baker Hughes Drilling Fluids.

Where the system fluid is oil-base, suitable viscosifiers are organophilic clays and suitable filtration control agents are asphaltic and lignitic materials.

Conventional additives may be used in the drilling fluid systems. Such additives include, but are not necessarily limited to shale stabilizer(s), filtration control additive(s), suspending agent(s), dispersant(s), thinner(s), anti-balling additive(s), lubricant(s), weighting agent(s), seepage control additive(s), lost circulation additive(s), drilling enhancer(s), penetration rate enhancer(s), corrosion inhibitor(s), acid(s), base(s), buffer(s), scavenger(s), gelling agent(s), cross-linker(s), catalyst(s), soluble salts, biocides; one or more bridging and/or weighting agents, and combinations thereof.

Where the drilling fluid system is a water-based fluid, the salt may be any monovalent salt commonly used in water-based drilling fluids, including, but not necessarily limited to sodium chloride, potassium chloride, sodium bromide, potassium bromide, sodium formate, potassium formate, cesium formate and mixtures thereof. Where the drilling fluid system is an oil-based fluid, the salt may be substantially any salt commonly used in formulating drilling fluid systems, including, but not necessarily limited to calcium chloride, sodium chloride, potassium chloride, magnesium chloride, calcium bromide, sodium bromide, potassium bromide, calcium nitrate, sodium formate, potassium formate, cesium formate and mixtures thereof.

In an alternate embodiment, the one or more oxygenated organic molecules and/or the latex are provided via a lost circulation pill. A lost circulation pill generally comprises from about 3 vol. % or more latex additive, based on the total volume of the lost circulation pill. In one embodiment, the lost circulation pill comprises from about 3 vol. % to about 20 vol. % latex additive. In another embodiment, the lost circulation pill comprises from about 5 vol. % to about 10 vol. % latex additive, based on the volume of the lost circulation pill. The lost circulation pill also typically comprises one or more additional component selected from the group consisting of a carrier compatible with the fluid to be treated, viscosifier/suspending agent(s), bridging agent(s), weighting agent(s), viscosifying agent(s), and alkalinity agent(s). In one embodiment, the lost circulation pill also typically comprises, for about 1 bbl. of carrier compatible with the fluid to be treated: from about 0 to about 13.6 kg. (30 lb.) viscosifier/suspending agent(s); from about 0 to about 45.4 kg. (100 lb.) bridging agent(s); weighting agent(s) in an amount sufficient to achieve a weight substantially the same as the drilling fluid system; from about 0 to about 0.9 kg. (2 lb.) viscosifying agent(s); and, from about 0 to about 0.9 kg (2 lb.) alkalinity agent(s). The following is one embodiment of a formulation of a lost circulation pill for treating a water-based fluid:

| | |
|---|---|
| Water, | 0.119 m³ (1 bbl). |
| MIL-GEL ™* | 0 to 13.6 kg. (30 lb.) |
| XANPLEX ® D | 0 to 0.9 kg. (2 lb.) |
| MAX-SHIELD ® (latex product) | 3% to 20% by vol. |
| MIL-CARB ® | 0 to 45.4 kg. (100 lb.) |
| MIL-BAR ® | to required mud weight |
| NaOH | 0 to 0.9 kg.(2 lb.) |

*The following are available from Baker Hughes Drilling Fluids:
MIL-GEL ™ is a ground montmorillonite used to simulate formation shale contaminant;
XANPLEX ® D ® is a modified xanthan polysaccharide;
MIL-CARB ® is a product comprising ground marble or calcium carbonate particles;
MIL-BAR ® is a barite additive.

In one embodiment, the foregoing lost circulation pill comprises from 5 to 10% by volume MAX-SHIELD®.

The application will be better understood with reference to the following examples, which are illustrative only and should not be construed as limiting the application to a particular embodiment.

Example 1

Table 1 shows the freezing point of propylene glycol based water solutions at different temperatures:

TABLE 1

Freezing Point of Propylene Glycol based Water Solutions

| | | Propylene Glycol Solution (% by mass) | | | | | | |
|---|---|---|---|---|---|---|---|---|
| | | 0 | 10 | 20 | 30 | 40 | 50 | 60 |
| Freezing Point Temperature | (° F.) | 32 | 26 | 18 | 7 | −8 | −29 | −55 |
| | (° C.) | 0 | −3 | −8 | −14 | −22 | −34 | −48 |

Table 2 shows the freezing point of glycerol based water solutions at different temperatures:

TABLE 2

Freezing Point of Glycerol based Water Solutions

| | | Glycerol Solution (% by mass) | | | | | | |
|---|---|---|---|---|---|---|---|---|
| | | 0 | 5 | 10 | 15 | 20 | 25 | 30 |
| Freezing Point Temperature | (° F.) | 32 | 30 | 28 | 25 | 22 | 18 | 12 |
| | (° C.) | 0 | −1.3 | −2.3 | −3.7 | −5.5 | −7.9 | −11 |

FIG. 1 is a graph of the freezing point of propylene glycol based water solutions. Based on the foregoing Tables and FIG. 1, it was estimated that 25 wt. % propylene glycol would lower the freezing point of MAX-SHIELD® (100 g: 30 g sulfonated styrene-butadiene, 45 g water, and 25 g propylene glycol) from 0° C. (32° F.°) to about −19° C. (−2° F.). The resulting sample with 25 wt. % propylene glycol contained 35.7 wt. % propylene glycol in the water phase [25/(25+45)= 35.7].

Based on the foregoing, the following solutions of MAX-SHIELD® and glycol were prepared for further testing:

TABLE 3

Sample compositions and calculated freezing points

| Sample No. | Description |
|---|---|
| 1 | MAX-SHIELD ® with 25 wt. % Propylene Glycol (calculated freezing point; −19° C. (−2° F.) |
| 2 | MAX-SHIELD ® with 25 wt. % Glycerol (calculated freezing point; −13° C. (9° F.) |
| 3 | MAX-SHIELD ® with 10 wt. % Propylene Glycol (calculated freezing point; 6° C. (22° F.) |
| 4 | MAX-SHIELD ® with 10 wt. % Glycerol (calculated freezing point; 4° C. (25° F.) |
| 5 | Control (pure MAX-SHIELD ®) (calculated freezing point; 0° C. (32° F.) |

Figure 2:
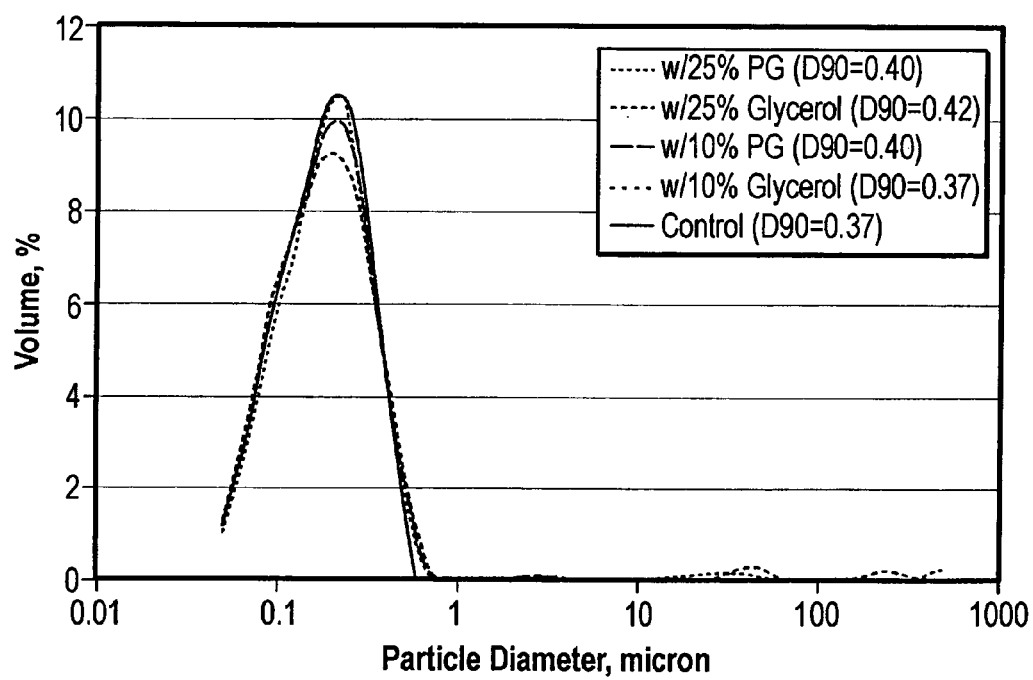
FIG. 2 is a graph of the initial particle size distributions of latex particles in fresh water from Example 1.
Figure 3:
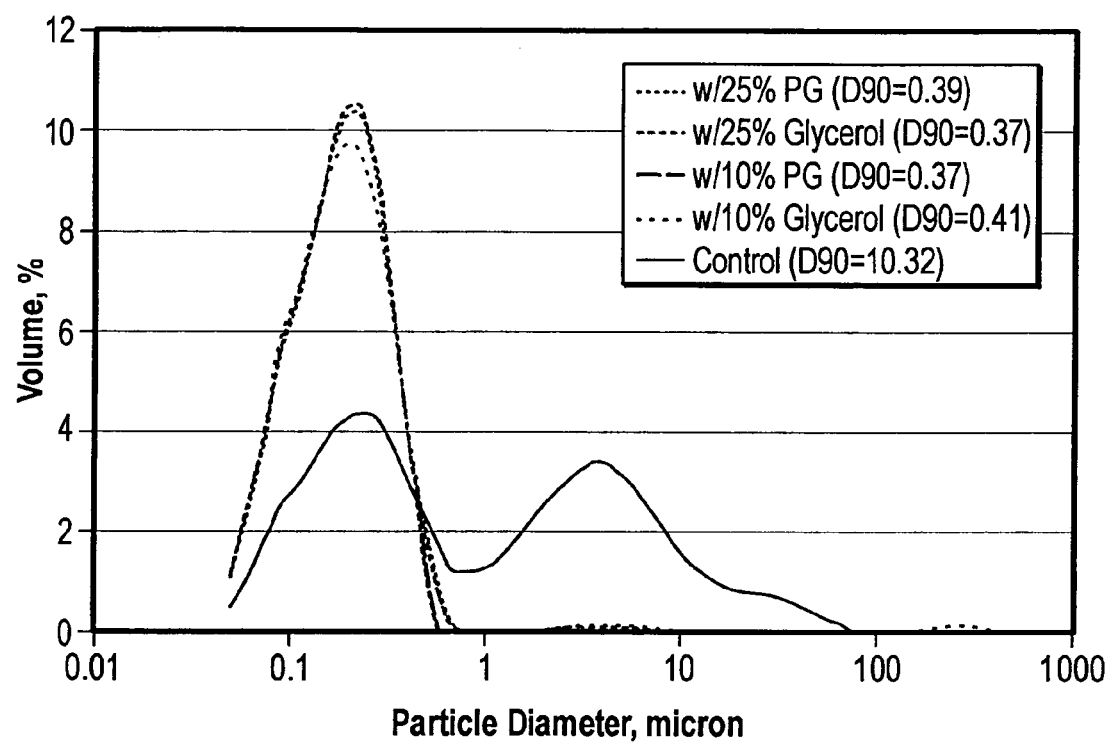
FIG. 3 is a graph of the particle size distributions of latex particles in fresh water after freezing at −23.3° C. (−10° F.) for 16 hours and subsequent melting at 37.8° C. (100° F.).

The particle size distribution for the initial samples was measured and is shown in FIG. 2. The initial samples were then frozen for 16 hours at −23.3° C. (−10° F.), melted at 37.8° C. (100° F.), and the particle size distribution of the final sample was measured. The results are given in FIG. 3.

The foregoing solutions were then used to prepare drilling fluid systems and the rheological properties were measured with the following results:

| | | | | | | |
|---|---|---|---|---|---|---|
| Water, m³ (bbl) | 0.09 (0.77) | 0.09 (0.77) | 0.09 (0.77) | 0.09 (0.77) | 0.09 (0.77) | 0.09 (0.77) |
| NaOH, kg(lb) | 0.18 (0.4) | 0.18 (0.4) | 0.18 (0.4) | 0.18 (0.4) | 0.18 (0.4) | 0.18 (0.4) |
| MIL-GEL ™, kg(lb) | 1.4 (3) | 1.4 (3) | 1.4 (3) | 1.4 (3) | 1.4 (3) | 1.4 (3) |
| NEW-DRILL ® PLUS, kg(lb) | 0.34 (0.75) | 0.34 (0.75) | 0.34 (0.75) | 0.34 (0.75) | 0.34 (0.75) | 0.34 (0.75) |
| XANPLEX ® D, kg(lb) | 0.23 (0.5) | 0.23 (0.5) | 0.23 (0.5) | 0.23 (0.5) | 0.23 (0.5) | 0.23 (0.5) |
| MIL-PAC ™ LV, kg(lb) | 0.45 (1) | 0.45 (1) | 0.45 (1) | 0.45 (1) | 0.45 (1) | 0.45 (1) |
| NaCl, (kg)lb | 5.1 (11.2) | 5.1 (11.2) | 5.1 (11.2) | 5.1 (11.2) | 5.1 (11.2) | 5.1 (11.2) |
| MIL-BAR ®, (kg)lb | 73.5 (162) | 73.5 (162) | 73.5 (162) | 73.5 (162) | 73.5 (162) | 73.5 (162) |
| MAX-GUARD ®, (kg)lb. | 3.2 (7) | 3.2 (7) | 3.2 (7) | 3.2 (7) | 3.2 (7) | 3.2 (7) |
| PENETREX ®, % | 2 | 2 | 2 | 2 | 2 | 2 |
| REV DUST ®, kg(lb) | 12.2 (27) | 12.2 (27) | 12.2 (27) | 12.2 (27) | 12.2 (27) | 12.2 (27) |
| MAX-SHIELD ® (Control), % | — | 3 | — | — | — | — |
| MAX-SHIELD ® (25% PG), % | — | — | 3 | — | — | — |
| MAX-SHIELD ® (25% Glycerol), % | — | — | — | 3 | — | — |
| MAX-SHIELD ® (10% PG), % | — | — | — | — | 3 | — |
| MAX-SHIELD ® (10% Glycerol), % | — | — | — | — | — | 3 |
| Hot Rolled at 150° F. for 16 hours | | | | | | |
| 600 rpm at 120° F. | 128 | 117 | 124 | 123 | 120 | 120 |
| 300 rpm | 93 | 80 | 91 | 85 | 84 | 83 |
| 200 rpm | 75 | 65 | 77 | 72 | 70 | 68 |
| 100 rpm | 51 | 47 | 53 | 50 | 51 | 48 |
| 6 rpm | 15 | 13 | 15 | 14 | 14 | 14 |
| 3 rpm | 12 | 10 | 12 | 11 | 12 | 12 |
| PV, cP | 35 | 37 | 33 | 38 | 36 | 37 |
| YP, kg/cm² (lb/100 ft²) | 2.34 (48) | 1.61 (33) | 2.83 (58) | 2.29 (47) | 2.34 (48) | 2.24 (46) |
| 10 second gel, kg/cm² (lb/100 ft²) | 0.59 (12) | 0.54 (11) | 0.68 (14) | 0.59 (12) | 0.63 (13) | 0.59 (12) |
| 10 minute gel, kg/cm² (lb/100 ft²) | 0.83 (17) | 0.78 (16) | 0.93 (19) | 0.83 (17) | 0.88 (18) | 0.83 (17) |
| API FL, ml | 8.6 | 6.8 | 7.5 | 8.0 | 7.2 | 7.3 |
| pH | 10.5 | 10.5 | 10.5 | 10.4 | 10.5 | 10.5 |
| Density, g/cm³ (lb/gal) | 1.45 (12.1) | 1.45 (12.1) | 1.45 (12.1) | 1.45 (12.1) | 1.45 (12.1) | 1.45 (12.1) |

In the foregoing Table, REV-DUST® is a simulated drilled product which may be obtained from Mu-White Company, Houston, Tex. The remaining products, represented by the symbol ™ or ® may be obtained from Baker Hughes Drilling Fluids.

The foregoing demonstrates that latex additives comprising latex particles, water, and one or more oxygenated organic molecules produced drilling fluid systems having adequate rheological properties.

Example 2

Five samples of MAX-SHIELD® containing propylene glycol or glycerol were subjected to multiple freeze-thaw cycles. The test results demonstrated that either compound lowered the freezing point and protected the latex from freeze damage. Glycols were more efficient and can be obtained at lower cost. Finally, MAX-SHIELD® samples blended with different concentrations of propylene glycol or ethylene glycol were evaluated after freezing for weeks in order to optimize the concentration of glycols used for freezing conditions.

Based on the tests, it was concluded that: the colloid particles of MAX-SHIELD® are damaged when frozen. Freezing has less effect on MAX-SHIELD® meeting the D90 size standards. Glycols and glycerol can be used to protect MAX-SHIELD® from freeze damage. Addition of propylene glycol, ethylene glycol or glycerol at concentrations up to 25% to MAX-SHIELD® generally will not change the original quality of MAX-SHIELD®. If MAX-SHIELD® does not meet the D90 size standards, then the addition of glycols or glycerol may not further improve its quality, especially for salt water applications. Compared with glycerol, propylene glycol and ethylene glycol are more efficient. After storage at −25° C. (−13° F.) for three weeks, MAX-SHIELD® blended with 8 to 10% by volume propylene glycol or ethylene glycol had identical stability to the original MAX-SHIELD® in both fresh water and 20% NaCl.

Equipment

1. Glass jar, 500 ml
2. Static oven
3. Prince Castle Mixer
4. Tachometer, hand held Stanco Model MT-1 digital
5. Mixing cups, 500 ml
6. Syringe, 20 ml
7. Balance, ±0.01 g
8. Malvern Mastersizer Particle Size Analyzer
9. 20 wt % NaCl solution: 800 g DI water+200.0 g NaCl Procedures Stability Test The stability of MAX-SHIELD® samples blended with glycols or glycerol was evaluated in fresh water and 20% NaCl solutions by the following procedures. The sample was prepared by adding 332.5 ml of deionized water or 20 wt. % NaCl solution to a 500 ml mixing cup. The cup was placed on a Prince Castle Mixer and stirring at 4000 rpm was initiated. 17.5 ml of MAX-SHIELD® was added to the cup at a uniform rate over a time interval of 60 seconds while stirring the solution. Total mixing time was 20±1 minute. The particle size distribution was measured, as described below. The solution was poured into a glass jar and then statically aged for 16 hours at 65.6° C. (150° F.). If the sample was not homogeneous after aging, the sample was discarded. The jar was cooled to room temperature and mixed at 4000 rpm for 10 minutes. The particle size distribution was determined, as described below.

Particle Size Distribution Test

In order to analyze particle size distribution, the Malvern Mastersizer Particle Size Analyzer is set up and checked to verify snug connections and that the cell and dispersion unit are free from contaminants (non-polar solvents that can form emulsions with water, etc.). The correct Presentation 5PAD (Particle R. L=1.5960, 0.000 and Dispersant R.I.=1.3300) is selected from the Setup menu and the Load is selected.

The Small Volume Dispersion Unit is filled with ~500 mL of deionized water or 20 wt. % NaCl solution depending on the dispersing media used for testing. The instrument uses this as a "blank" or baseline. The instrument is started, with the box marked "Pause at each stage" unchecked. Where the obscuration fluctuates between 0.0% and 0.1%, the sample is added drop-wise until the Obscuration % reads between 11% and 15%, and the "obscuration bar" is within the green range. When the instrument finishes measuring the sample, the screen containing the results and graph automatically return and the results are saved. The volume percent under 1 μm (for before aging test) are recorded and the volume percent under 37 μm (for after aging test) is recorded from the analysis report. Where desired, another analysis of the sample is performed. To analyze a new sample, the Dispersion Unit is thoroughly drained and cleaned before repeating the procedure.

The product is also observed for any tendency towards foaming in a high salt environment. Visible or measurable (volume change) signs of foam are noted after the solution containing 5% MAX-SHIELD® is sheared and then allowed to remain static for 1 minute.

After review of some environmentally friendly anti-freeze compounds which might be used in drilling fluids, five MAX-SHIELD® samples were prepared. The following Table lists the compositions and calculated freezing points of the samples:

| Sample ID | Description | Calculated Freezing Point, °C./°F. |
|---|---|---|
| A | MAX-SHIELD with 25% Propylene Glycol | −19/−2 |
| B | MAX-SHIELD with 25% Glycerol | −13/9 |
| C | MAX-SHIELD with 10% Propylene Glycol | −6/22 |
| D | MAX-SHIELD with 10% Glycerol | −4/25 |
| E | Control (pure MAX-SHIELD) | 0/32 |

The samples were first tested in a chiller at approximately 12.2° C. (10° F.) in order to determine their freezing points. After eight hours at 12.2° C. (10° F.), the control sample E (pure MAX-SHIELD®) froze. The anti-freeze treated samples did not freeze although the storage temperature was below the calculated freezing points of the samples, C (with 10% propylene glycol) and D (with 10% glycerol). Particle size distributions of these samples were measured using fresh water as the dispersing media. There were no significant differences in particle distributions among these samples before freezing.

Example 3

Figure 4:
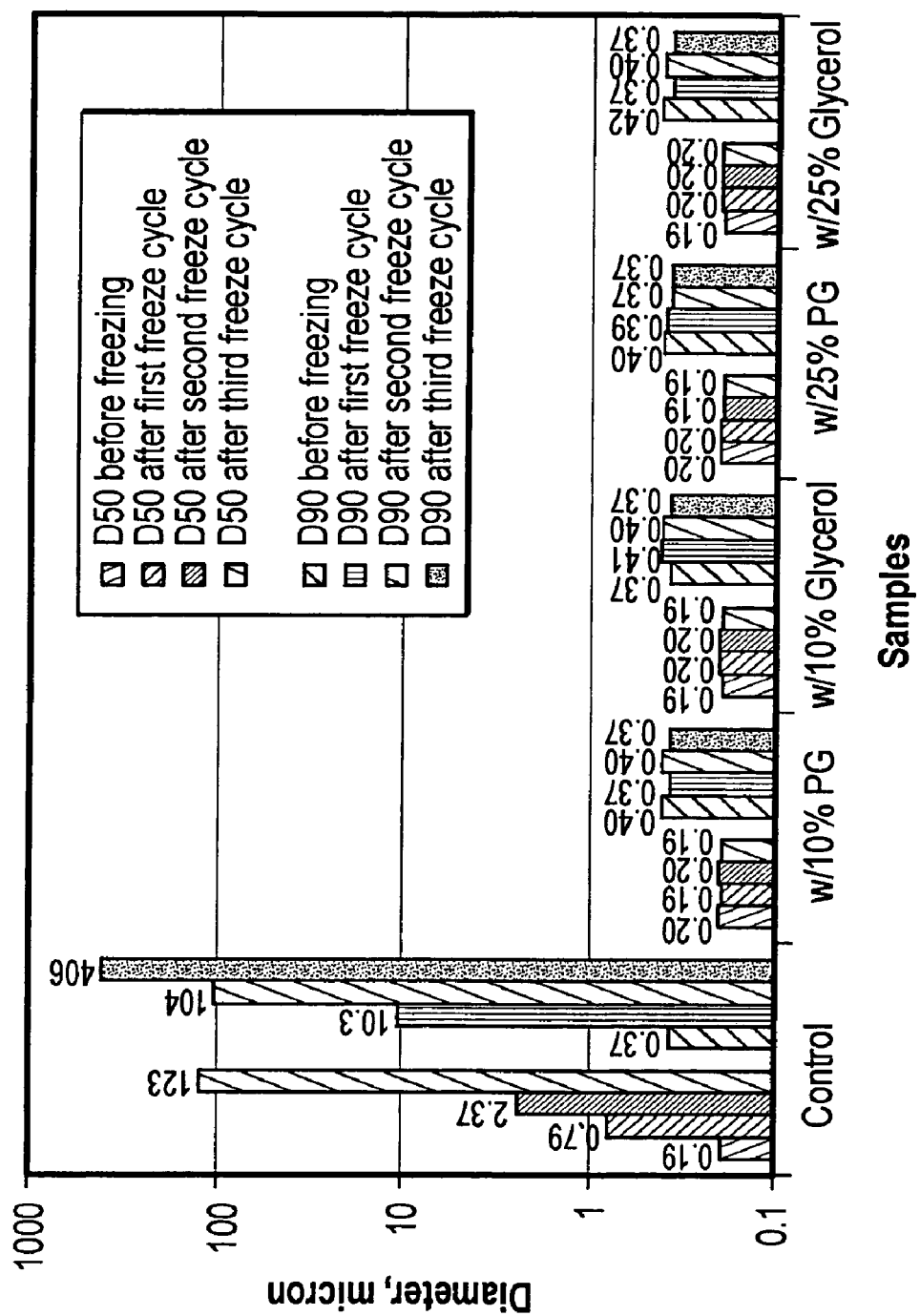
FIG. 4 is a chart of fresh water particle size distributions of MAX-SHIELD® samples before and after freezing for the samples listed in Table 3. MAX-SHIELD® comprises sulfonated styrene/butadiene copolymers, and is commercially available from Baker Hughes Drilling Fluids

Another test was conducted by storing the five samples at −25° C. (−13° F.). After 16 hours, all samples were frozen. The frozen samples were thawed in an oven at 37.8° C. (100° F.) for eight hours and the particle size distribution was analyzed. Finally, the samples were frozen and thawed again under the same conditions. FIG. 4 compares the changes in D50 (50% sample by volume is smaller than this diameter) and D90 (90% sample by volume is smaller than this diameter), before and after freezing. All samples blended with propylene glycol or glycerol had similar particle size distributions in fresh water before and after freezing. By contrast, the control sample was flocculated and its particle size distribution shifted to larger particles after freezing. This indicated that 10% propylene glycol or glycerol not only reduced the freezing point of the MAX-SHIELD® but also protected the colloidal latex particles from the effects of freezing. The same samples were evaluated in 1,438 k/m³ (12 lb/gal) 4% NaCl PERFORMAX® mud. The results listed in the following Table confirm the foregoing results:

| | | | | | | |
|---|---|---|---|---|---|---|
| Density, kg/l (lb/gal) | 1.46 (12.2) | 1.45 (12.1) | 1.45 (12.1) | 1.45 (12.1) | 1.45 (12.1) | 1.45 (12.1) |
| MAX-SHIELD ® (Control), % | — | 3 | — | — | — | — |
| MAX-SHIELD ® (25% PG), % | — | — | 3 | — | — | — |
| MAX-SHIELD ® (25% Glycerol), % | — | — | — | 3 | — | — |
| MAX-SHIELD ® (10% PG), % | — | — | — | — | 3 | — |
| MAX-SHIELD ® (10% Glycerol), % | — | — | — | — | — | 3 |
| Properties After 16 Hour 150° F. Hot Roll | | | | | | |
| 600 rpm at 49° C.(120° F.) | 128 | 117 | 124 | 123 | 120 | 120 |
| 300 rpm | 93 | 80 | 91 | 85 | 84 | 83 |
| 200 rpm | 75 | 65 | 77 | 72 | 70 | 68 |
| 100 rpm | 51 | 47 | 53 | 50 | 51 | 48 |
| 6 rpm | 15 | 13 | 15 | 14 | 14 | 14 |
| 3 rpm | 12 | 10 | 12 | 11 | 12 | 12 |
| PV, cP | 35 | 37 | 33 | 38 | 36 | 37 |
| YP, kg/cm$^2$ (lb/100 ft$^2$) | 2.34 (48) | 1.61 (33) | 2.83 (58) | 2.29 (47) | 2.34 (48) | 2.24 (46) |
| 10 second gel, kg/cm$^2$ (lb/100 ft$^2$) | 0.59 (12) | 0.54 (11) | 0.68 (14) | 0.59 (12) | 0.63 (13) | 0.59 (12) |
| 10 minute gel, kg/cm$^2$ (lb/100 ft$^2$) | 0.83 (17) | 0.78 (16) | 0.93 (19) | 0.83 (17) | 0.88 (18) | 0.83 (17) |
| API FL, ml | 8.6 | 6.8 | 7.5 | 8.0 | 7.2 | 7.3 |
| PH | 10.5 | 10.5 | 10.5 | 10.4 | 10.5 | 10.5 |

Example 4

In order to verify the foregoing results, samples were prepared using the same control MAX-SHIELD® (E, Example 2) treated with 99% purity propylene glycol (1, 2 propanediol, $C_3H_8O_2$, MW: 76.1) from Sigma-Aldrich. Samples were prepared with 0%, 3%, 5%, 10% and 15% of propylene glycol as listed in the following Table.

| Sample | Control (SL-9) | SL-9 w/2% PG | SL-9 w/4% PG | SL-9 w/6% PG | SL-9 w/8% PG | SL-9 w/10% PG |
|---|---|---|---|---|---|---|
| Freezing point, ° C./° F. | 0/32 | 0.6/31.0 | 1.39/29.5 | 2.4/27.7 | 3.6/25.6 | 4.9/23.1 |

Again all samples with propylene glycol were not damaged after freezing. Further tests were conducted with 20% NaCl as the dispersing media. In this test MAX-SHIELD® SL-7 was used as the control sample.

Figure 5:
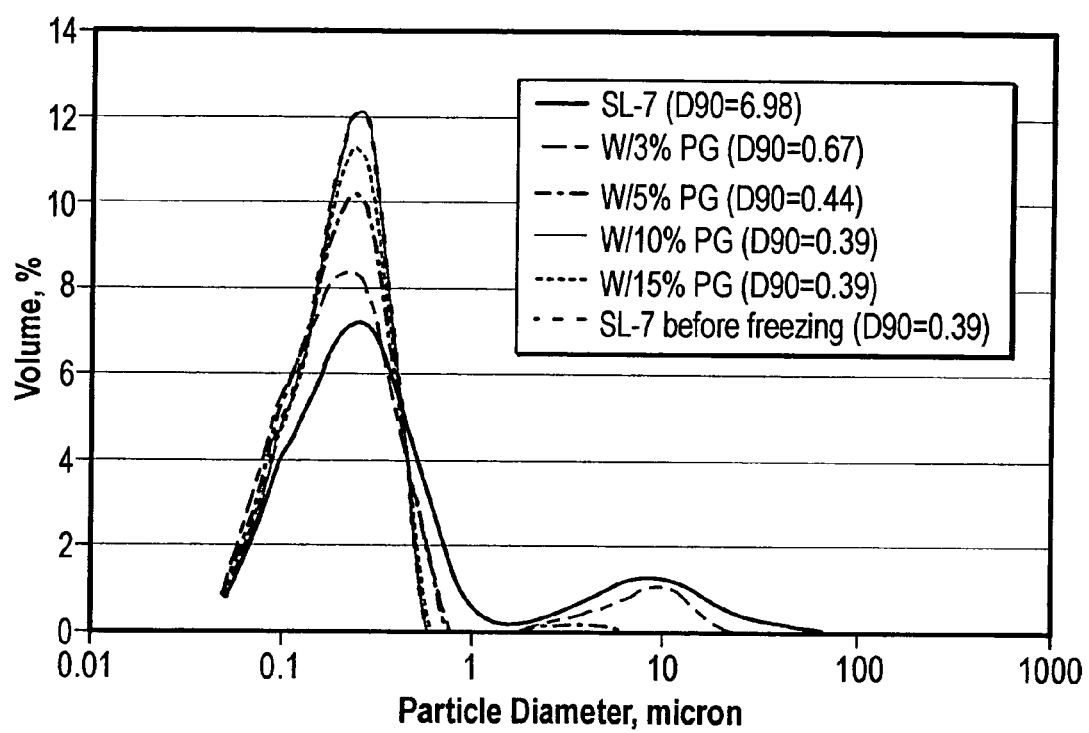
FIG. 5 is a graph of post-freeze, 20% NaCl particle size distributions for MAX-SHIELD® (SL-7) blended with propylene glycol. MAX-SHIELD® (SL-7, or "super lot# 7").
Figure 6:
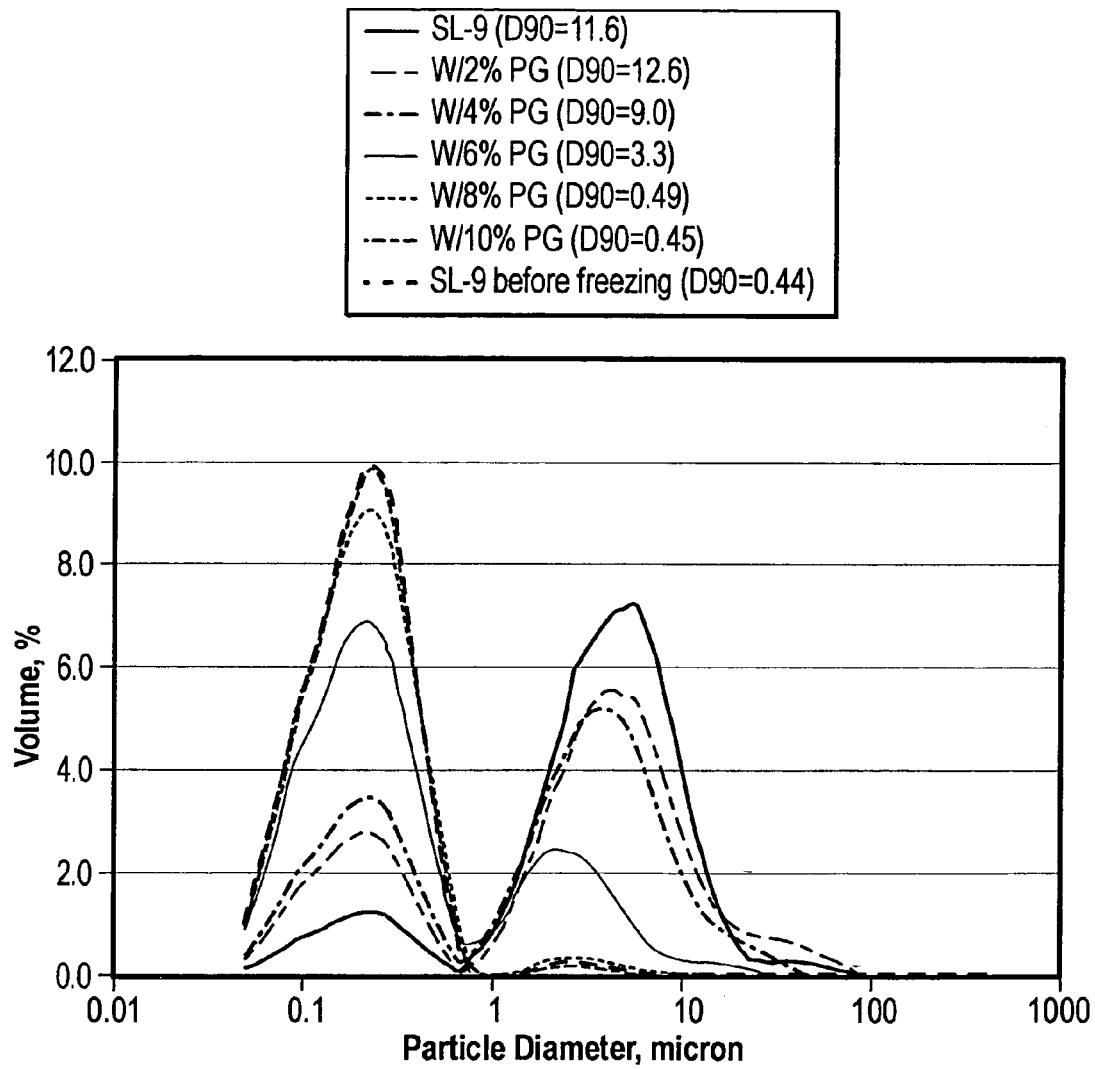
FIG. 6 is a graph of post freeze, 20% NaCl particle size distributions before static aging for MAX-SHIELD® (SL-9) blended with propylene glycol [one week at −25° C. (−13° F.)]. MAX-SHIELD® (SL-9, or super lot# 9).
Figure 7:
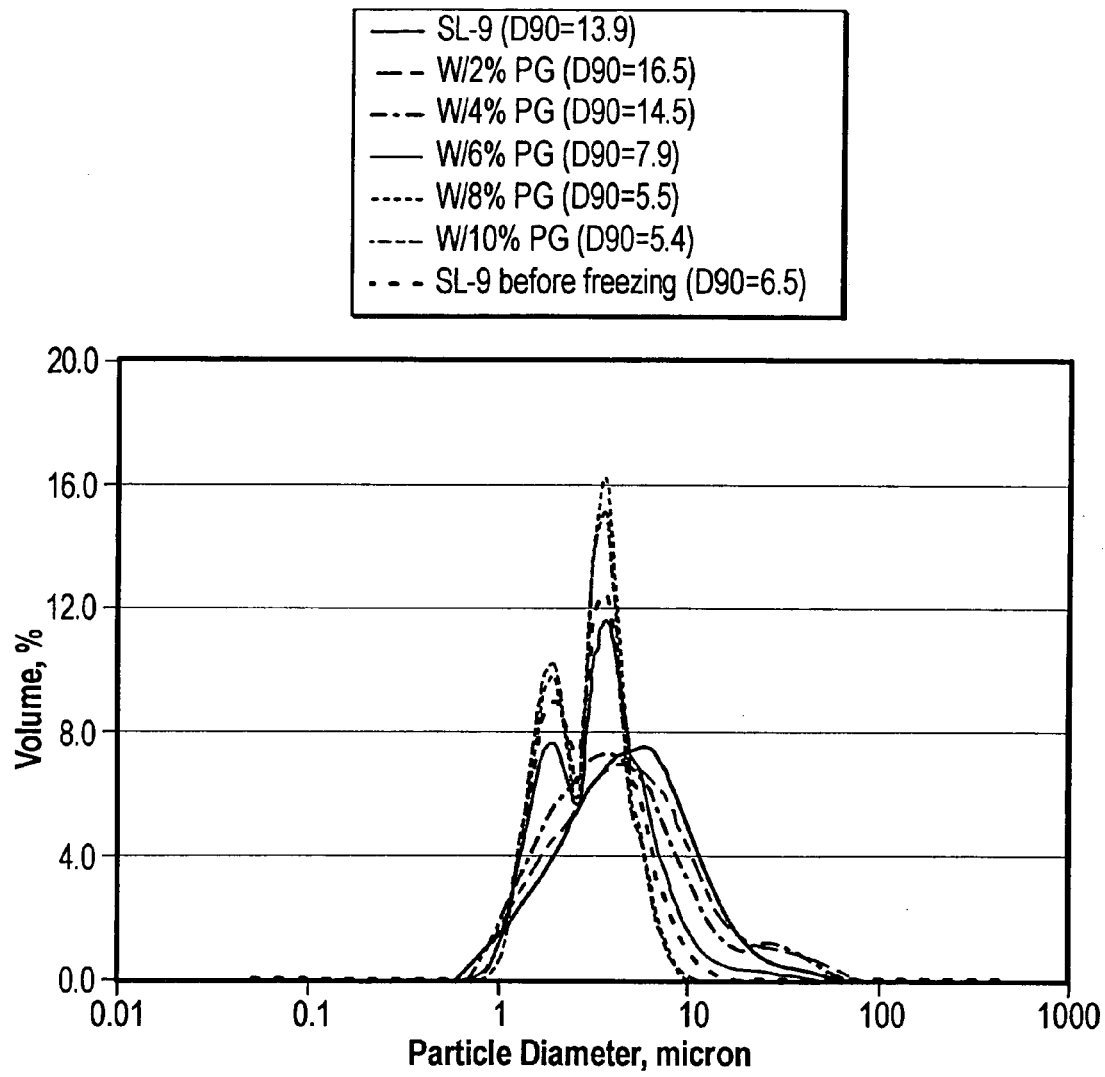
FIG. 7 is a graph of 20% NaCl particle size distributions after static aging at 65.6° C. (150° F.) for MAX-SHIELD® (SL-9) blended with propylene glycol [one week at −25° C. (−13° F.)].
Figure 8:
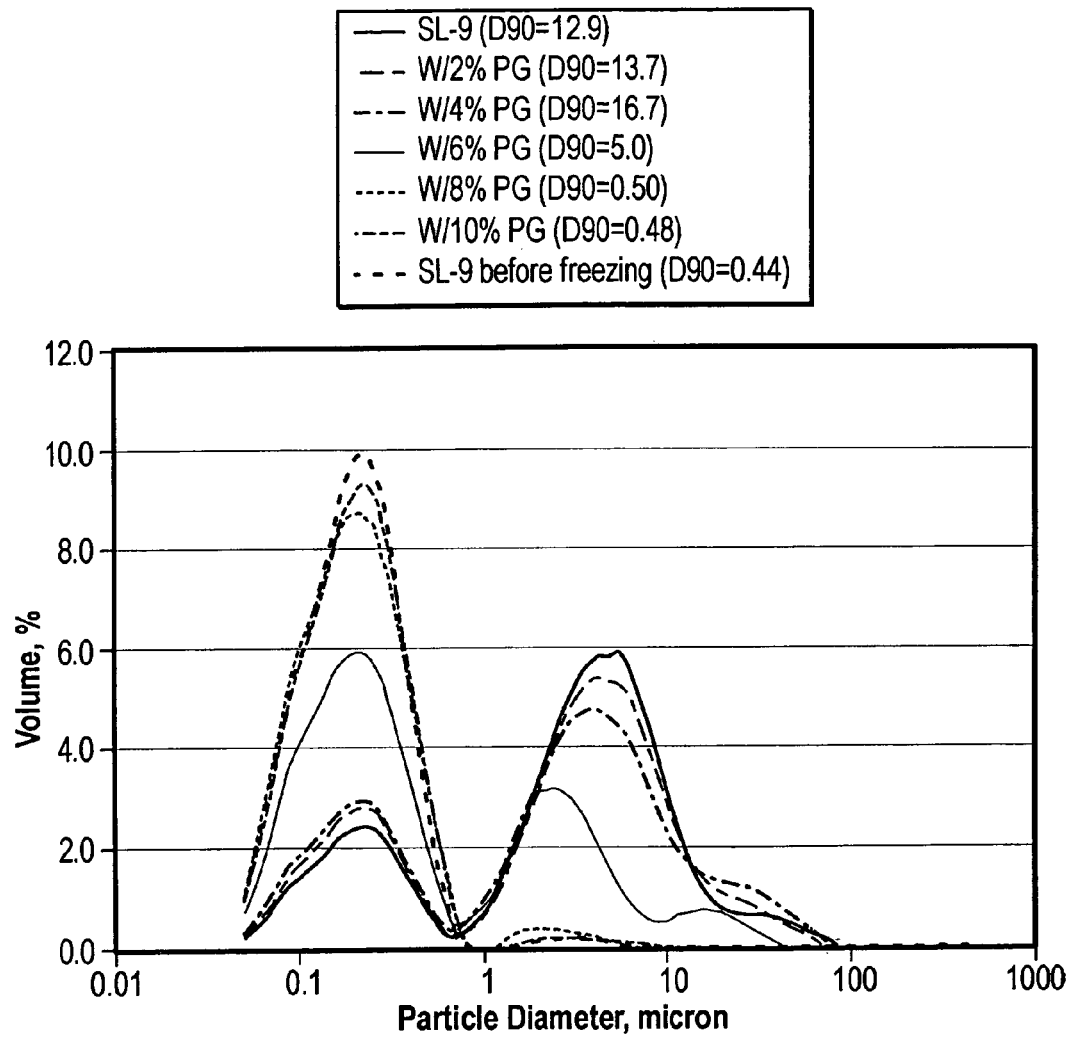
FIG. 8 is a graph of 20% NaCl particle size distributions before static aging for MAX-SHIELD® (SL-9) blended with propylene glycol [two weeks at −25° C. (−13° F.)].
Figure 9:
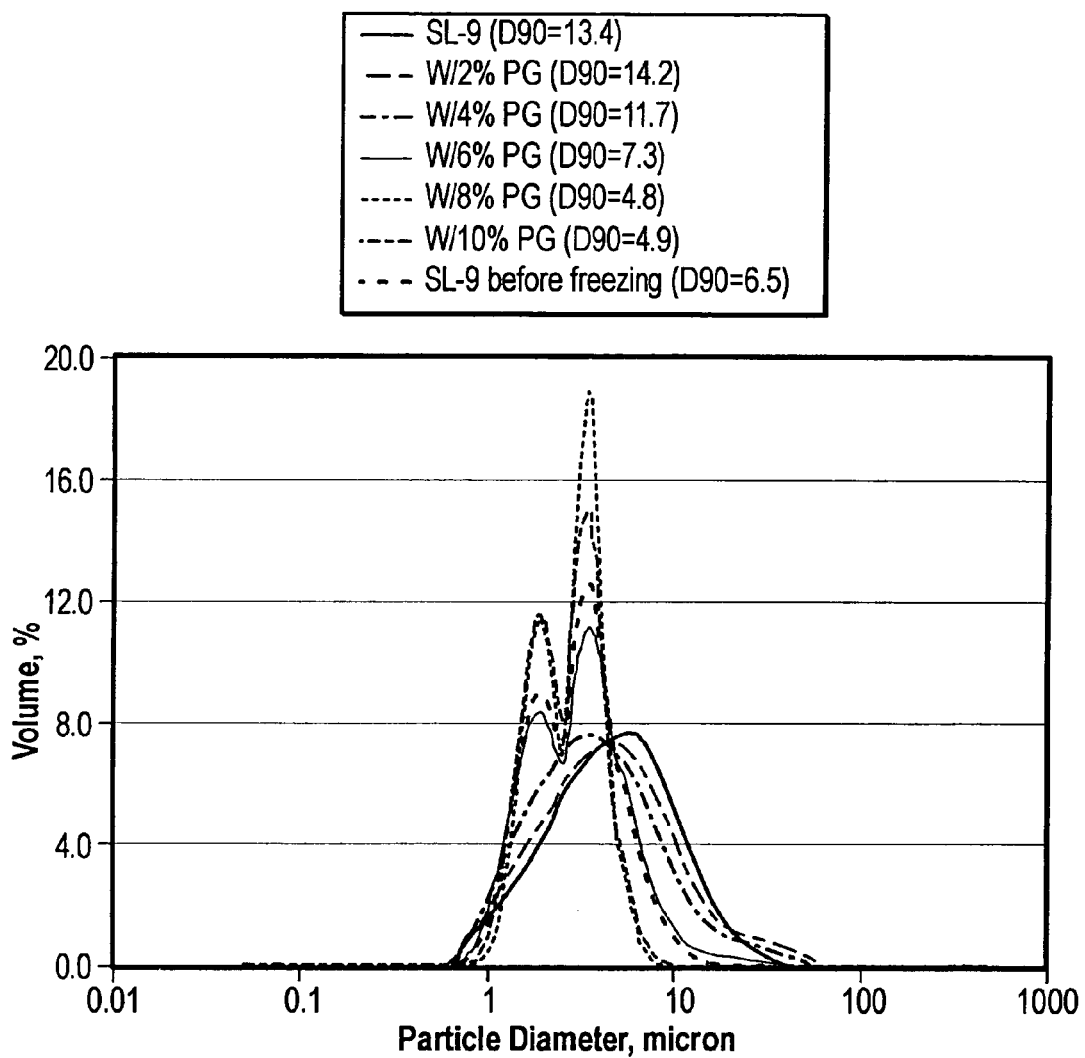
FIG. 9 is a graph of post freeze, 20% NaCl particle size distributions after static aging at 65.6° C. (150° F.) for MAX-SHIELD® (SL-9) blended with propylene glycol [two weeks at −25° C. (−13° F.)].
Figure 10:
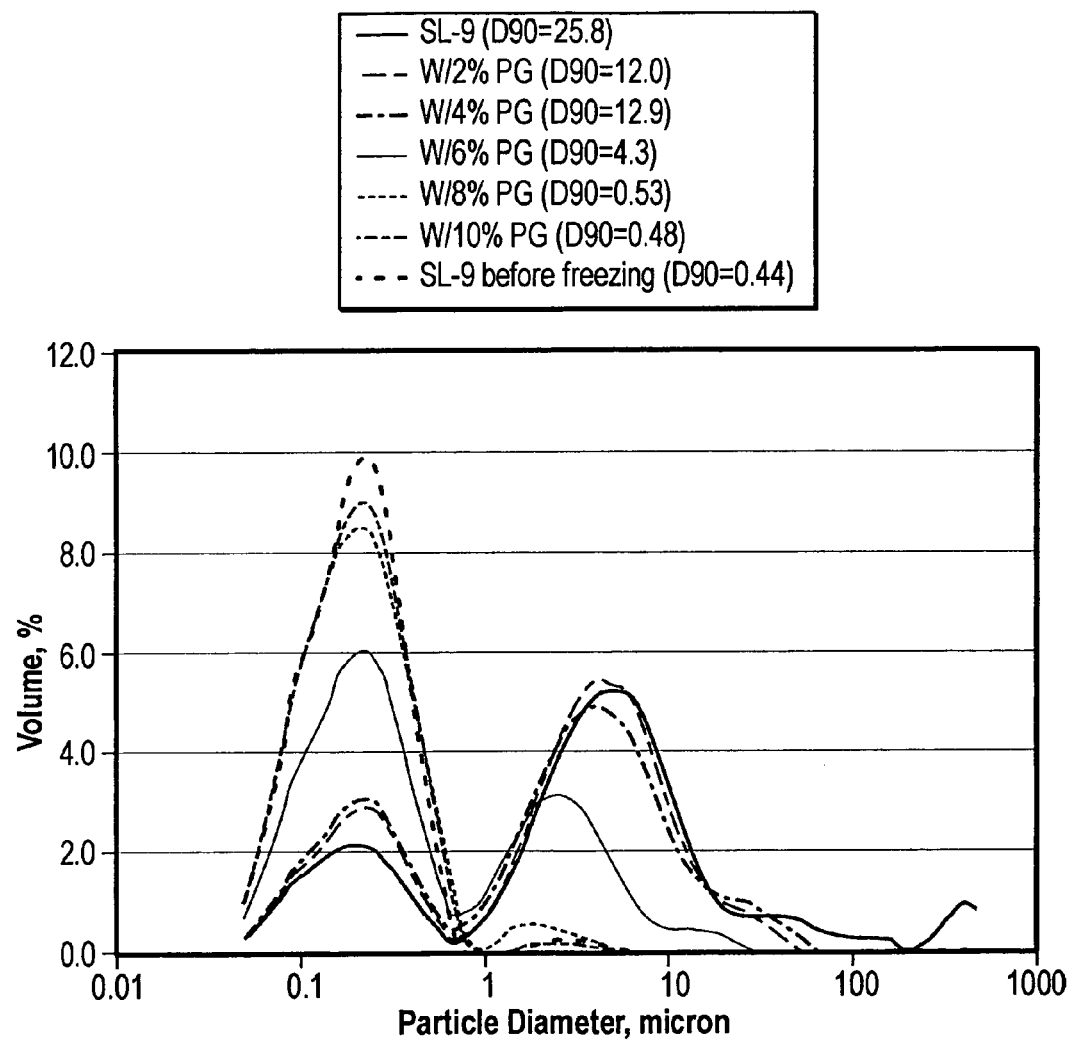
FIG. 10 is a graph of 20% NaCl particle size distributions before static aging for MAX-SHIELD® (SL-9) blended with propylene glycol [three weeks at −25° C. (-13-F.)].
Figure 11:
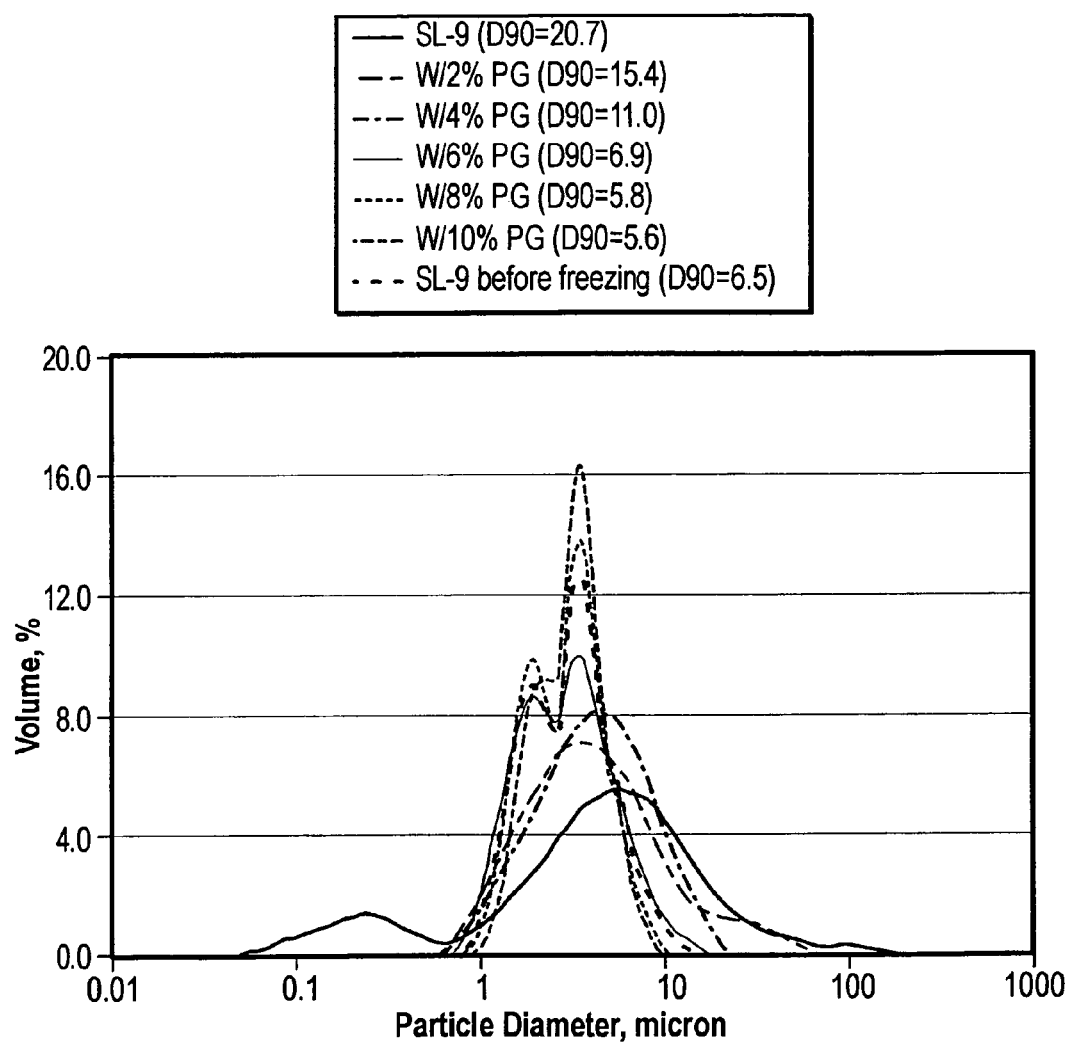
FIG. 11 is a graph of post freeze, 20% NaCl particle size distributions after static aging at 65.6° C. (150° F.) for MAX-SHIELD® (SL-9) blended with propylene glycol [three weeks at −25° C. (−13° F.)].

FIG. 5 shows the particle size distribution in 20% NaCl for MAX-SHIELD® SL-7 samples blended with propylene glycol after storage at −25° C. (−13° F.) for 16 hours. These results indicate that if MAX-SHIELD® has good stability in 20% NaCl, the blended product with 10% propylene glycol will have similar stability in 20% sodium chloride after freezing.

Example 5

Figure 12:
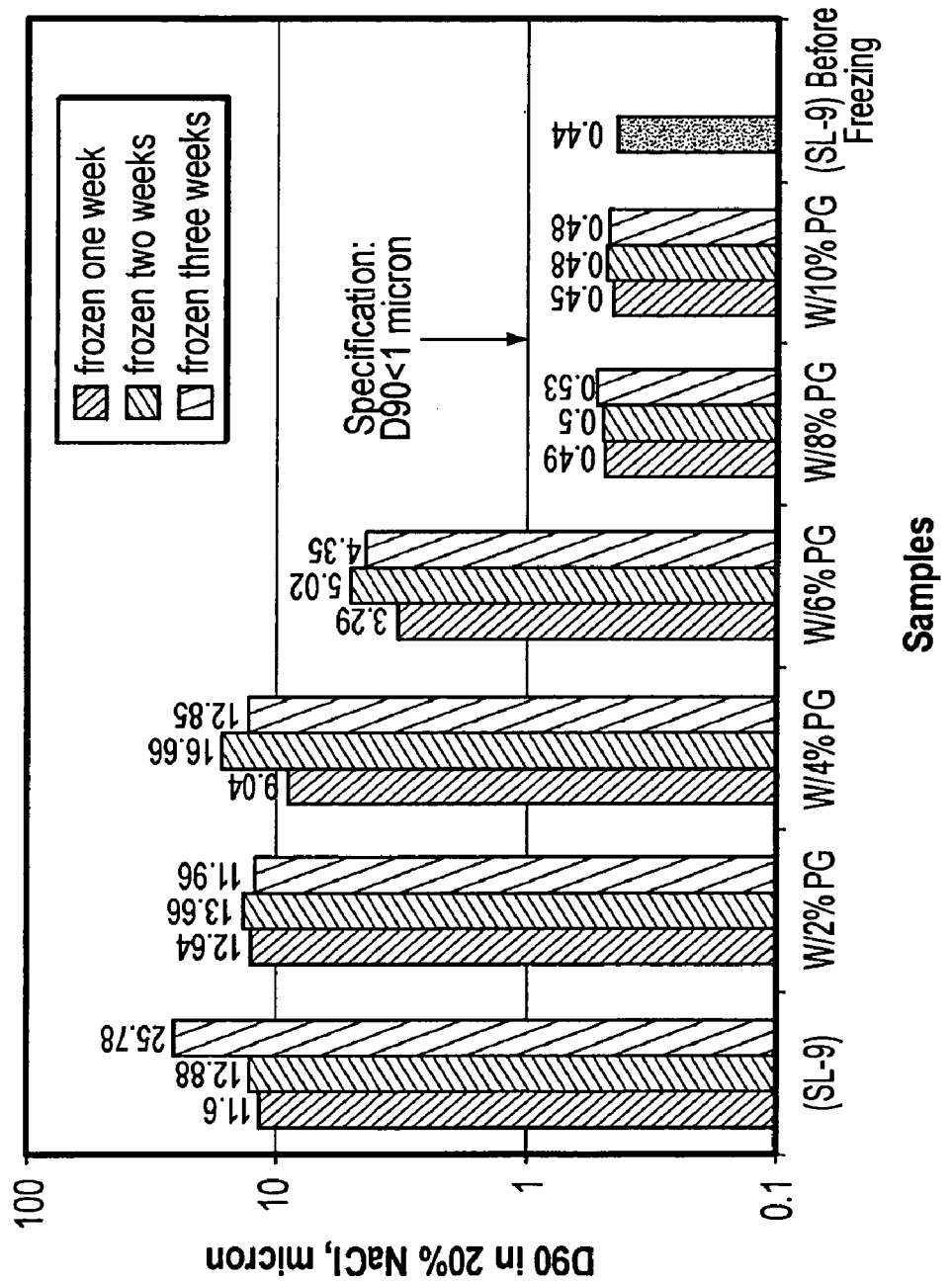
FIG. 12 is a chart comparing particle size distributions of MAX-SHIELD® samples blended with propylene glycol in 20% NaCl before static aging.
Figure 13:
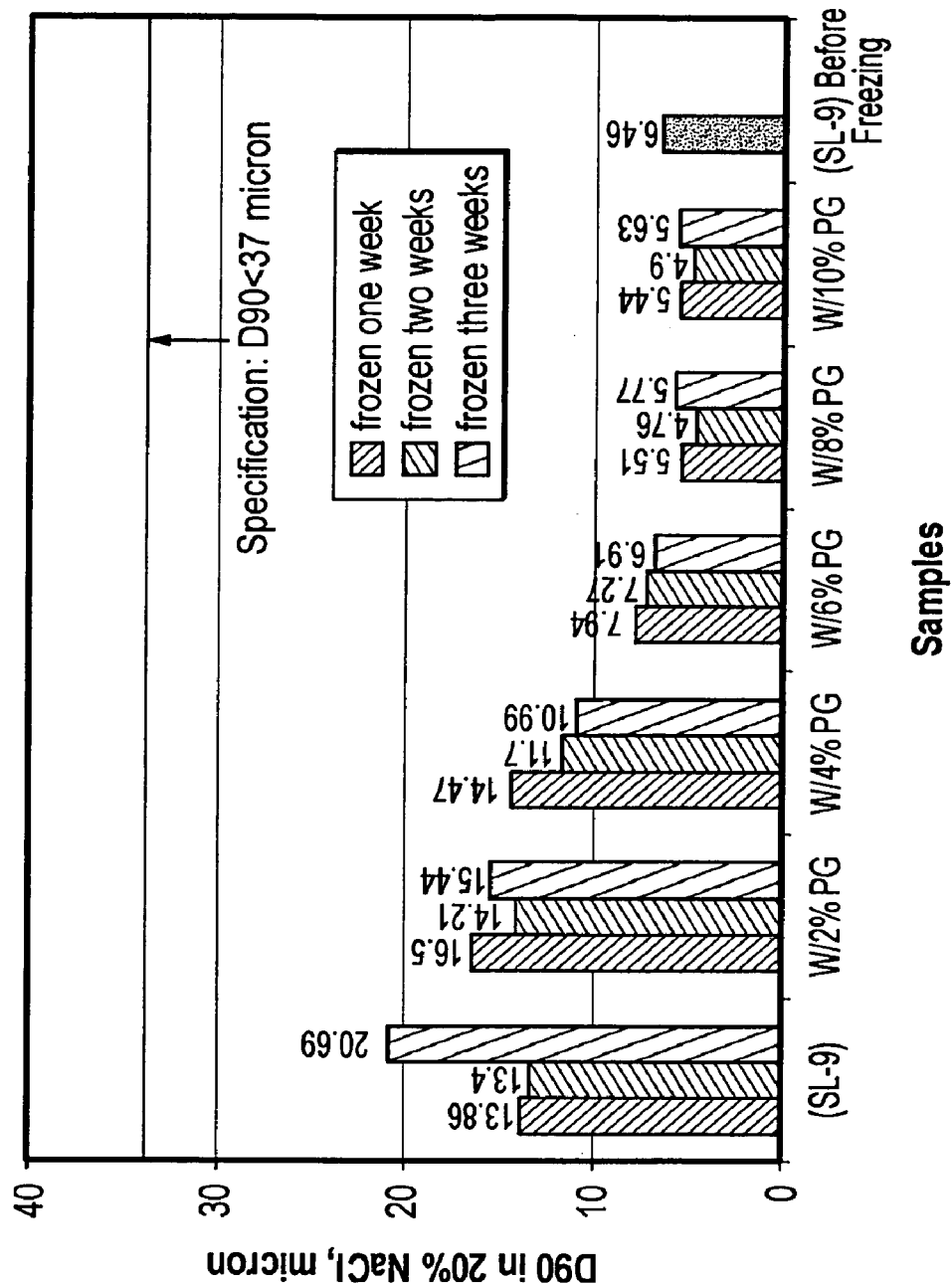
FIG. 13 is a chart comparing particle size distributions of MAX-SHIELD® samples blended with propylene glycol in 20% NaCl after static aging at 65.6° C. (150® F.).

Further tests were conducted after MAX-SHIELD® samples were frozen and thawed for three cycles. Samples were stored at −25° C. (−13° F.) for one week and then completely thawed at room temperature or about 24° C. (75° F.) in each testing cycle. The Table in the previous example lists sample compositions and calculated freezing points. The particle size distributions of these MAX-SHIELD® samples in 20% NaCl before and after static aging at about 66° C. (150° F.) are shown in FIG. 6-11. FIG. 12 compares the changes in D50 and D90 in 20% NaCl before aging. FIG. 13 compares the changes in D50 and D90 in 20% NaCl after static aging at about 66° C. (150° F.) for 16 hours. These results confirmed that MAX-SHIELD® blended with 10% propylene glycol has the same quality as the untreated product before freezing.

Example 6

Ethylene glycol was evaluated as an alternative freeze protector for MAX-SHIELD® after samples were frozen for one week and then thawed at about 24° C. (75° F.). The following Table lists sample compositions and calculated freezing points:

| Sample | Control (SL-9) | SL-9 w/2% PG | SL-9 w/4% PG | SL-9 w/6% PG | SL-9 w/8% PG | SL-9 w/10% PG |
|---|---|---|---|---|---|---|
| Freezing point, ° C./° F. | 0/32.0 | 0.61/30.9 | −1.41/29.4 | −2.41/27.6 | −3.71/25.3 | −5.2/22.7 |

Figure 14:
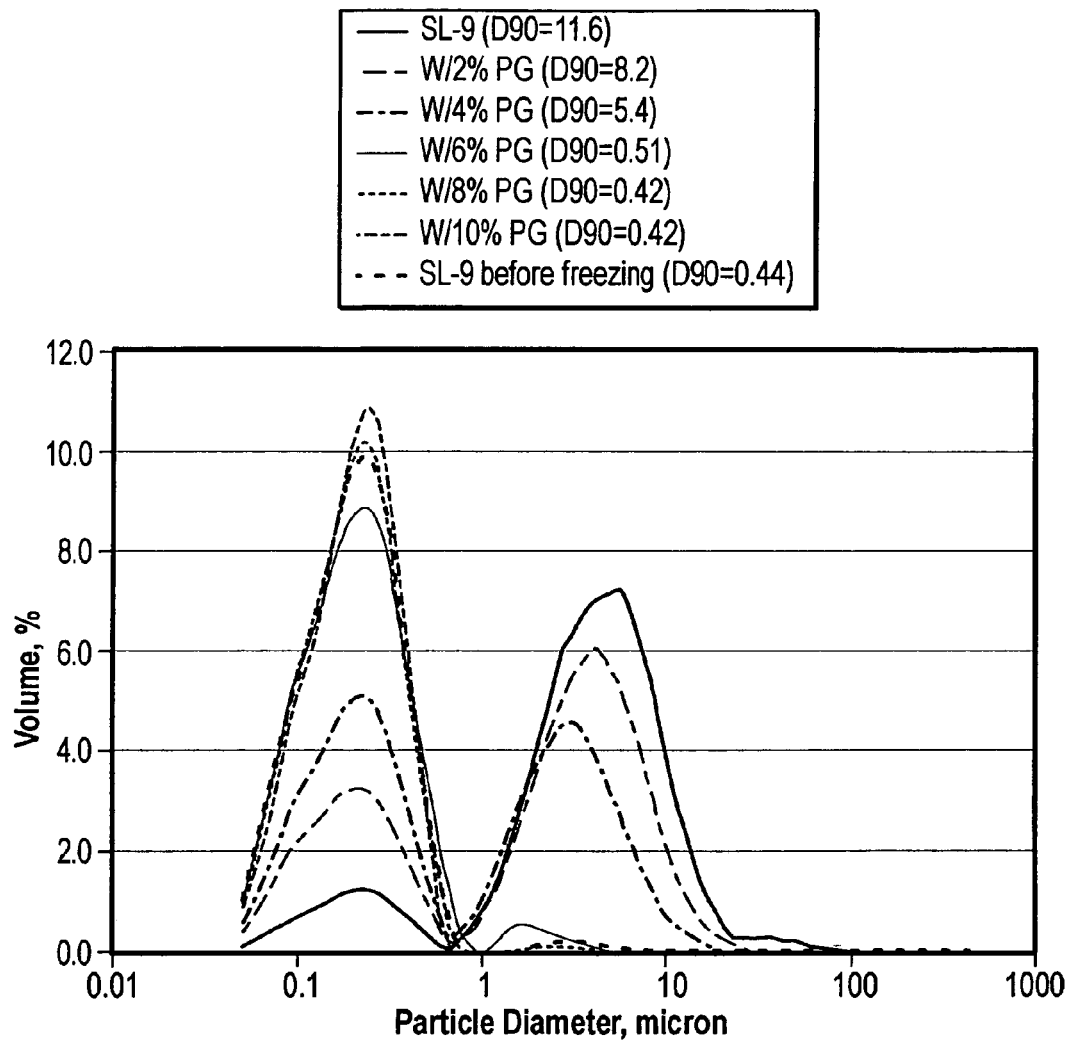
FIG. 14 is a graph illustrating the effect of ethylene glycol on particle size distributions of MAX-SHIELD® in 20% NaCl before static aging [samples frozen for one week at −25° C. (−13° F.)].
Figure 15:
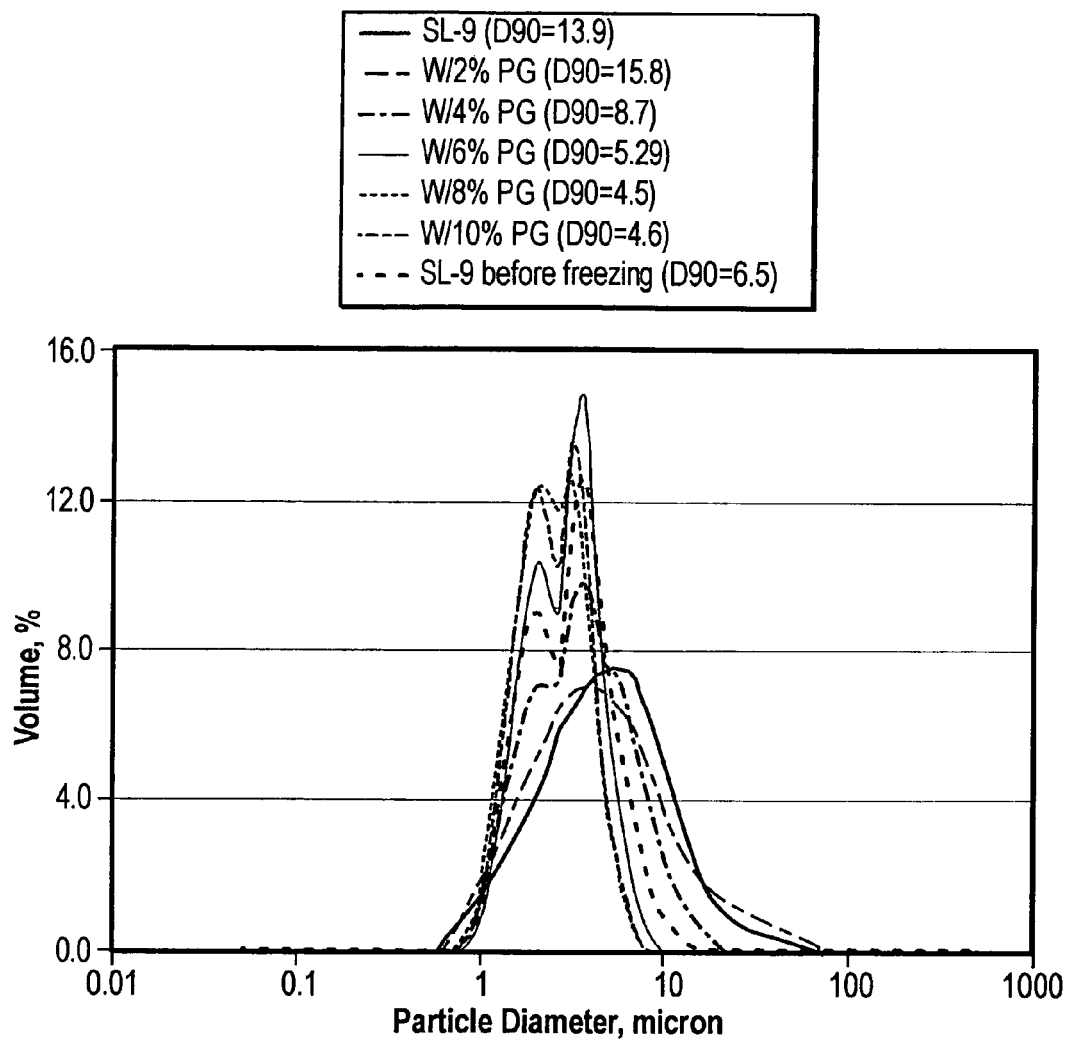
FIG. 15 is a graph illustrating the effect of ethylene glycol on particle size distributions of MAX-SHIELD® in 20% NaCl after static aging at 65.6° C. (150° F.) for 16 hours [samples frozen for one week at −25° C. (−13° F.)].
Figure 16:
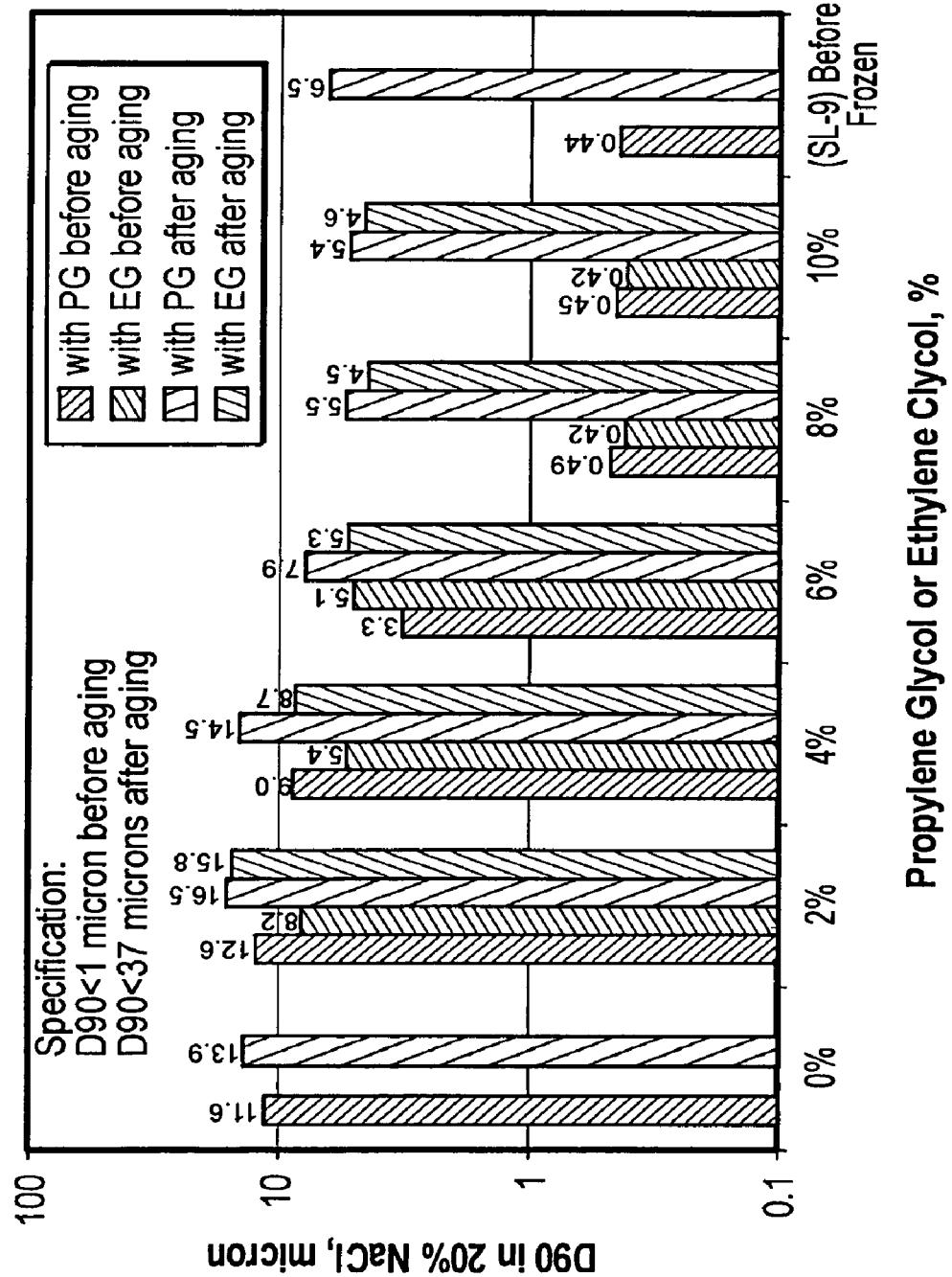
FIG. 16 is a chart illustrating the effects of glycol on D90 of MAX-SHIELD® after storage at −25° C. (−13° F.) for one week.
Figure 17:
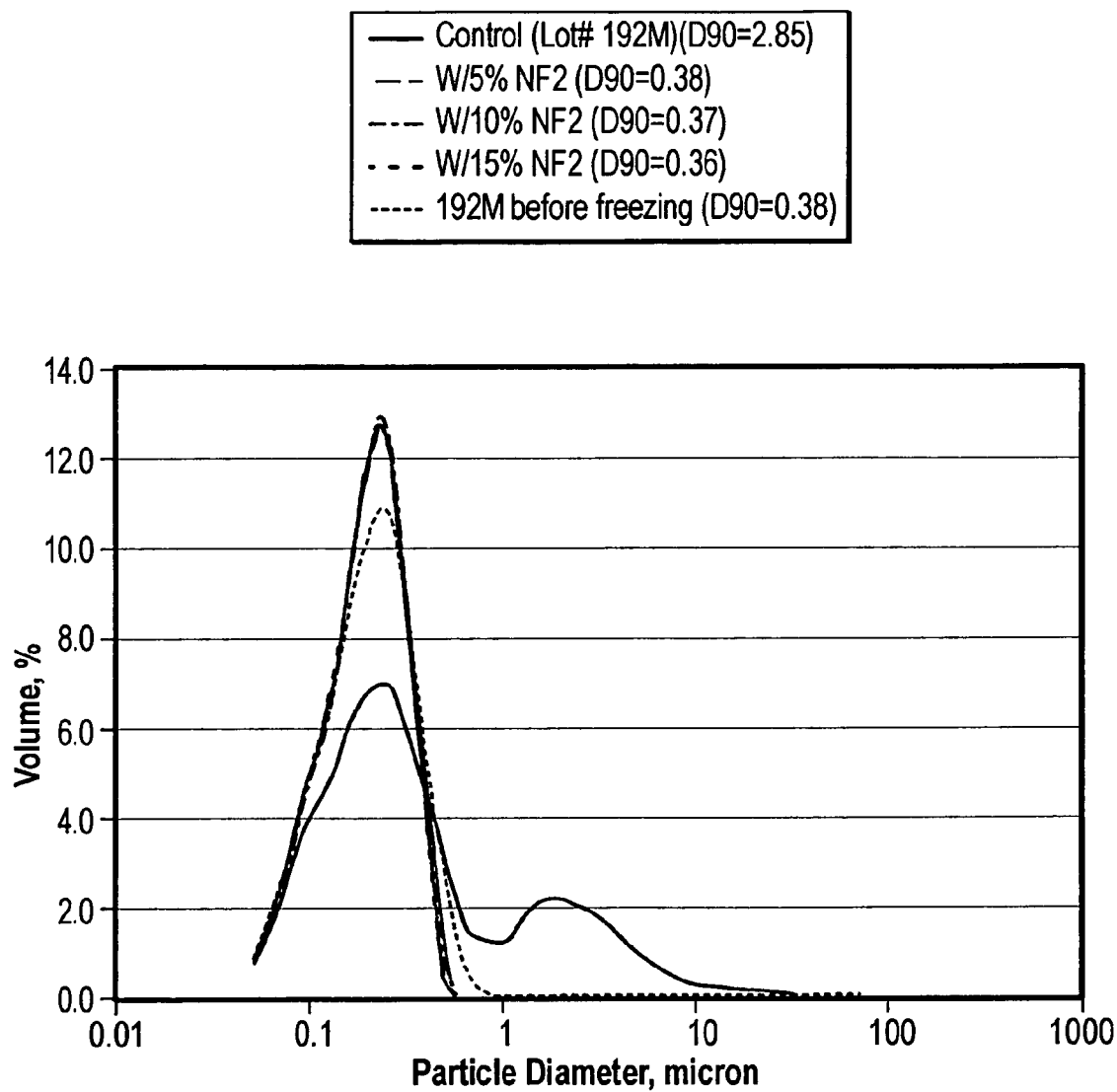
FIG. 17 is a graph illustrating the effect of NF-2 on MAX-SHIELD® particle size distribution in 20% NaCl before static aging [samples frozen 24 hours at −25° C. (−13° F.)]. NF-2 is an ethylene glycol product of Baker Hughes Incorporated.
Figure 18:
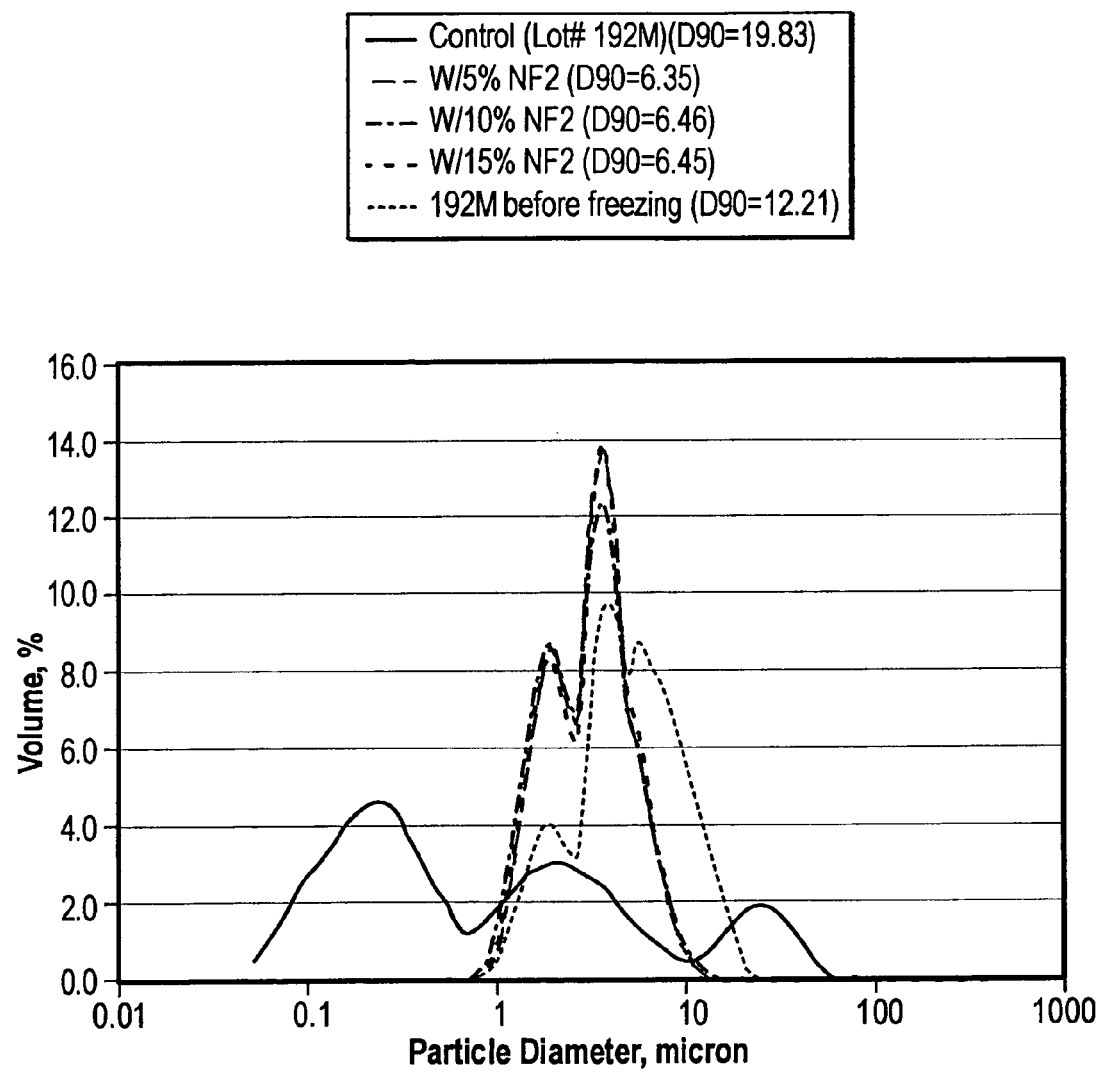
FIG. 18 is a graph illustrating the effect of NF-2 on MAX-SHIELD® particle size distribution in 20% NaCl before static aging [samples frozen 24 hours at −25° C. (−13° F.)].
Figure 19:
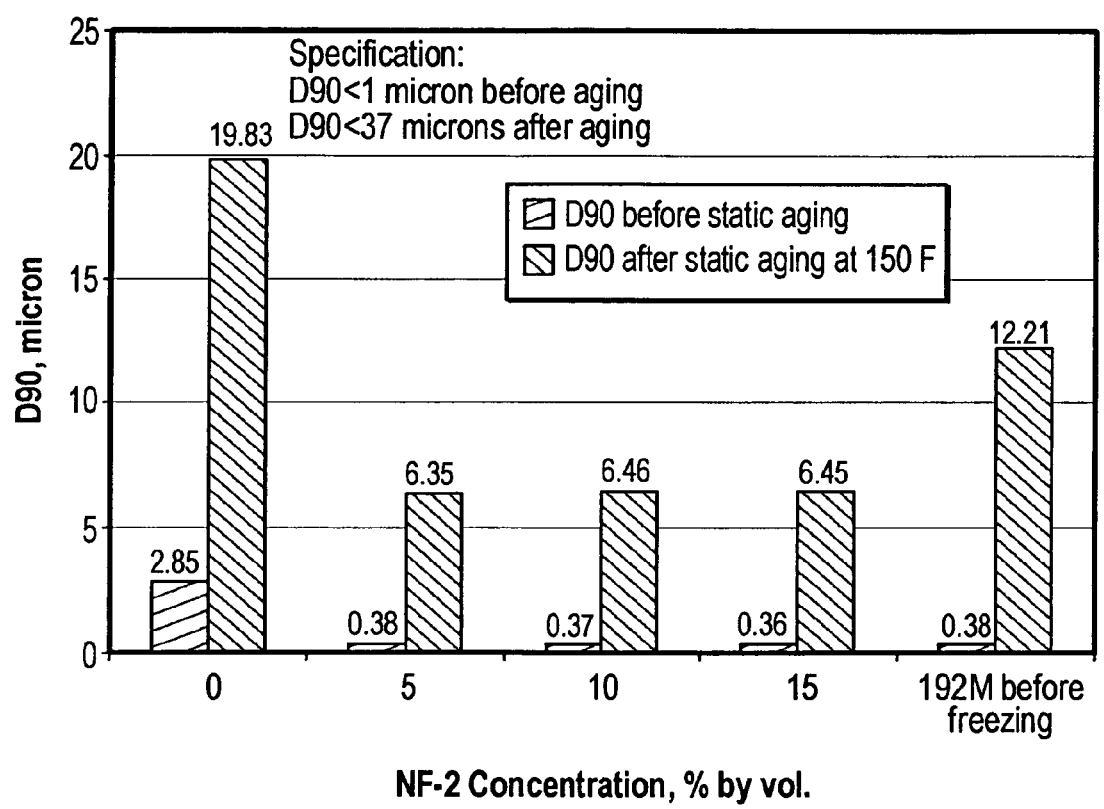
FIG. 19 is a graph illustrating the effect of NF-2 on D90 of MAX-SHIELD® after storage at −25° C. (−13° F.) for 24 hours and thawed at 23.9° C. (75° F.).

The particle size distributions in 20% NaCl before and after static aging at about 66° C. (150° F.) for 16 hours are shown in FIG. 14 and FIG. 15, respectively. FIG. 16 compares the effect of propylene glycol and ethylene glycol on the D90 of MAX-SHIELD® after storage at −25° C. (−13° F.) for one week. Ethylene glycol provides similar freeze protection to propylene glycol. NF-2, an ethylene glycol product of Baker Hughes Drilling Fluids, also was tested as freeze protector. The particle size distributions in 20% NaCl for MAX-SHIELD® (lot# 192M) with 0%, 5%, 10% and 15% of NF-2 are shown in FIGS. 17 to 19.

Persons of ordinary skill in the art will recognize that many modifications may be made to the methods and compositions described in the present application without departing from the spirit and scope of the present application. The embodiment described herein is meant to be illustrative only and should not be taken as limiting the "invention," which is defined in the claims.

We claim:

1. A method for preventing freeze damage to latex particles in a drilling fluid system having rheological properties, the method comprising providing the drilling fluid system with latex additive comprising an aqueous solution consisting essentially of the latex particles and about 5 wt. % or more of one or more water soluble oxygenated organic molecules sufficient to maintain substantially the same latex particle size distribution before and after freezing of the latex additive during laboratory testing, wherein the latex additive substantially maintains the rheological properties of the drilling fluid system.

2. The method of claim 1 wherein the latex particle size distribution before freezing comprises an average particle diameter of about 1 micron or less and the quantity of the one or more water soluble oxygenated organic molecules is sufficient to maintain substantially the same latex particle size distribution after freezing.

3. The method of claim 2 wherein the latex particles comprise sulfonated styrene/butadiene copolymer.

4. The method of claim 1 wherein the latex particle size distribution before freezing comprises an average particle diameter of about 0.5 micron or less and the quantity of the one or more water soluble oxygenated organic molecules is sufficient to maintain the substantially the same latex particle size distribution after freezing.

5. The method of claim 1 wherein the quantity of one or more water soluble oxygenated organic molecules is about 40 wt. % or less, based on the total weight of the latex additive.

6. The method of claim 1 comprising providing the drilling fluid system, with from about 0.1 vol. % to about 10 vol. % of the latex additive, based on the total volume of the drilling fluid system.

7. The method of claim 1 wherein the latex additive comprises from about 10 wt. % to about 70 wt. % latex particles.

8. The method of claim 1 wherein the latex particles comprise sulfonated styrene/butadiene copolymer.

9. The method of claim 1 wherein the drilling fluid system is a water-based drilling fluid system.

10. The method of claim 1 wherein the water soluble organic molecules have a weight average molecular weight of about 800 or less.

11. The method of claim 1 wherein the water soluble organic molecules are selected from the group consisting of glycerol and glycols having from 2-7 carbon atoms.

12. The method of claim 1 wherein the water soluble organic molecules are selected from the group consisting of propylene glycol, ethylene glycol, glycerol, and combinations thereof.

13. A method for preventing freeze damage to latex particles in a drilling fluid system, the method comprising providing the drilling fluid system with from about 0.1 vol. % to about 10 vol. % latex additive, based on the total volume of the drilling fluid system, the latex additive comprising an aqueous solution consisting essentially of the latex particles and from about 5 wt. % to about 40 wt. % of one or more water soluble oxygenated organic molecules.

14. The method of claim 13 wherein the drilling fluid system is a water-based drilling fluid system.

15. The method of claim 14 wherein the latex additive comprises from about 10 wt. % to about 70 wt. % latex particles.

16. The method of claim 15 wherein the latex particles comprise sulfonated styrene/butadiene copolymer.

17. The method of claim 16 wherein the water soluble organic molecules have a weight average molecular weight of about 800 or less.

18. The method of claim 16 wherein the water soluble organic molecules are selected from the group consisting of glycerol and glycols having from 2-7 carbon toms.

19. The method of claim 16 wherein the water soluble organic molecules are selected from the group consisting of propylene glycol, ethylene glycol, glycerol, and combinations thereof.

20. The method of claim 15 wherein the water soluble organic molecules have a weight average molecular weight of about 800 or less.

21. The method of claim 15 wherein the water soluble organic molecules are selected from the group consisting of glycerol and glycols having from 2-7 carbon atoms.

22. The method of claim 15 wherein the water soluble organic molecules are selected from the group consisting of propylene glycol, ethylene glycol, glycerol, and combinations thereof.

23. The method of claim 14 wherein the latex particles comprise sulfonated styrene/butadiene copolymer.

24. The method of claim 13 wherein the quantity of the one or more oxygenated organic molecules is about 25 wt. % or less, based on the total weight of the latex additive.

25. The method of claim 24 wherein the latex additive comprises from about 10 wt. % to about 70 wt. % latex particles.

26. The method of claim 13 wherein the latex additive comprises from about 10 wt. % to about 70 wt. % latex particles.

27. The method of claim 13 wherein the latex particles comprise sulfonated styrene/butadiene copolymer.

28. The method of claim 13 wherein the water soluble organic molecules have a weight average molecular weight of about 800 or less.

29. The method of claim 13 wherein the water soluble organic molecules are selected from the group consisting of glycerol and glycols having from 2-7 carbon atoms.

30. The method of claim 13 wherein the water soluble organic molecules are selected from the group consisting of propylene glycol, ethylene glycol, glycerol, and combinations thereof.

31. A lost circulation pill comprising:
   carrier compatible with a drilling fluid system to be treated;
   one or more weighting agent in an amount sufficient to achieve a weight substantially the same as the drilling fluid system to be treated; and
   a quantity of latex additive comprising an aqueous solution consisting essentially of latex particles and about 5 wt. % or more of one or more water soluble oxygenated organic molecules sufficient to maintain substantially the same latex particle size distribution before and after the freezing of the latex additive during laboratory testing.

32. The lost circulation pill of claim 31 wherein the quantity of latex additive is from about 3 vol. % to about 20 vol. % of the lost circulation pill.

33. The lost circulation pill of claim 32 wherein the quantity of one or more water soluble oxygenated organic molecules is from about 5 wt. % to about 40 wt. %, based on the total weight of the latex additive.

34. The lost circulation pill of claim 33 wherein the latex particles comprise sulfonated styrene/butadiene copolymer.

35. The lost circulation pill of claim 33 wherein the water soluble organic molecules have a weight average molecular weight of about 800 or less.

36. The lost circulation pill of claim 33 wherein the water soluble organic molecules are selected from the group consisting of glycerol and glycols having from 2-7 carbon toms.

37. The lost circulation pill of claim 33 wherein the water soluble organic molecules are selected from the group consisting of propylene glycol, ethylene glycol, glycerol, and combinations thereof.

38. The lost circulation pill of claim 32 wherein the latex additive comprises from about 10 wt. % to about 70 wt. % latex particles.

39. The lost circulation pill of claim 32 wherein the latex particles comprise sulfonated styrene/butadiene copolymer.

40. The lost circulation pill of claim 31 wherein the latex additive comprises from about 10 wt. % to about 70 wt. % latex particles.

41. The lost circulation pill of claim 40 wherein the latex particles comprise sulfonated styrene/butadiene copolymer.

42. The lost circulation pill of claim 41 wherein the water soluble organic molecules have a weight average molecular weight of about 800 or less.

43. The lost circulation pill of claim 41 wherein the water soluble organic molecules are selected from the group consisting of glycerol and glycols having from 2-7 carbon toms.

44. The lost circulation pill of claim 41 wherein the water soluble organic molecules are selected from the group consisting of propylene glycol, ethylene glycol, glycerol, and combinations thereof.

45. The lost circulation pill of claim 31 wherein the water soluble organic molecules have a weight average molecular weight of about 800 or less.

46. The lost circulation pill of claim 45 wherein the water soluble organic molecules have a weight average molecular weight of about 800 or less.

47. The lost circulation pill of claim 45 wherein the water soluble organic molecules are selected from the group consisting of glycerol and glycols having from 2-7 carbon toms.

48. The lost circulation pill of claim 45 wherein the water soluble organic molecules are selected from the group consisting of propylene glycol, ethylene glycol, glycerol, and combinations thereof.

49. The lost circulation pill of claim 31 further comprising one or more component selected from the group consisting of up to about 32 lb. viscosifier/suspending agent, up to about 100 lb. bridging agent, and up to about 2 lb. alkalinity agent, and combinations thereof.

50. The lost circulation pill of claim 31 wherein the latex particle size distribution before freezing comprises an average particle diameter of about 1 micron or less and the quantity of the one or more water soluble oxygenated organic molecules is sufficient to maintain substantially the same latex particle size distribution after freezing during laboratory testing.

51. The lost circulation pill of claim 31 wherein the latex particle size distribution before freezing comprises an average particle diameter of about 0.5 micron or less and the quantity of the one or more water soluble oxygenated organic molecules is sufficient to maintain substantially the same latex particle size distribution after freezing during laboratory testing.

52. The lost circulation pill of claim 31 wherein the quantity of one or more water soluble oxygenated organic molecules is from about 5 wt. % to about 40 wt. %, based on the total weight of the latex additive.

53. The lost circulation pill of claim 31 wherein the latex particles comprise sulfonated styrene/butadiene copolymer.

54. The lost circulation pill of claim 31 comprising from about 5 to about 10% by volume latex particles.

55. The lost circulation pill of claim 31 wherein the water soluble organic molecules are selected from the group consisting of glycerol and glycols having from 2-7 carbon atoms.

56. The lost circulation pill of claim 31 wherein the water soluble organic molecules are selected from the group consisting of propylene glycol, ethylene glycol, glycerol, and combinations thereof.

* * * * *

UNITED STATES PATENT AND TRADEMARK OFFICE
CERTIFICATE OF CORRECTION

PATENT NO.        : 7,749,943 B2
APPLICATION NO.   : 11/284163
DATED             : July 6, 2010
INVENTOR(S)       : Tao Xiang and Dennis K. Clapper Page 1 of 1

It is certified that error appears in the above-identified patent and that said Letters Patent is hereby corrected as shown below:

Col. 17 lines 40-42
cancel claim 46.

Signed and Sealed this
First Day of February, 2011

David J. Kappos
*Director of the United States Patent and Trademark Office*

UNITED STATES PATENT AND TRADEMARK OFFICE
CERTIFICATE OF CORRECTION

Page 1 of 2

PATENT NO.         : 7,749,943 B2
APPLICATION NO.    : 11/284163
DATED              : July 6, 2010
INVENTOR(S)        : Tao Xiang and Dennis K. Clapper It is certified that error appears in the above-identified patent and that said Letters Patent is hereby corrected as shown below:

Delete the title page and substitute therefore the attached title page showing the corrected number of claims in patent.

Col. 17 lines 40-42
cancel claim 46.

This certificate supersedes the Certificate of Correction issued February 1, 2011.

Signed and Sealed this
First Day of March, 2011

David J. Kappos
*Director of the United States Patent and Trademark Office*

CERTIFICATE OF CORRECTION (continued)

(12) United States Patent
Xiang et al.

(10) Patent No.: US 7,749,943 B2
(45) Date of Patent: Jul. 6, 2010

(54) METHOD AND DRILLING FLUID SYSTEMS AND LOST CIRCULATION PILLS ADAPTED TO MAINTAIN THE PARTICLE SIZE DISTRIBUTION OF COMPONENT LATEX PARTICLES BEFORE AND AFTER FREEZING OF THE LATEX PARTICLES IN THE PRESENCE OF WATER

(75) Inventors: Tao Xiang, Cypress, TX (US); Dennis K. Clapper, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 747 days.

(21) Appl. No.: 11/284,163

(22) Filed: Nov. 21, 2005

(65) Prior Publication Data
US 2006/0116294 A1 Jun. 1, 2006

Related U.S. Application Data

(60) Provisional application No. 60/632,090, filed on Dec. 1, 2004.

(51) Int. Cl.
*C09K 8/24* (2006.01)
*E21B 7/00* (2006.01)

(52) U.S. Cl. .................... 507/122; 175/65; 175/72; 507/117; 507/119; 507/125; 507/136; 507/139; 516/77

(58) Field of Classification Search ................ 507/122, 507/117, 119, 125, 136, 139; 175/65, 72; 516/77
See application file for complete search history.

(56) References Cited

U.S. PATENT DOCUMENTS

| | | |
|---|---|---|
| 2,809,179 A | 10/1957 | Endres et al. |
| 3,724,547 A | 4/1973 | Bott et al. |
| 3,730,271 A | 5/1973 | Gall |
| 3,780,806 A | 12/1973 | Bott |
| 3,799,969 A | 3/1974 | Hoppe |
| 4,436,636 A | 3/1984 | Carnicom |
| 4,458,050 A | 7/1984 | Heyman |
| 4,486,316 A | 12/1984 | Carriere et al. |
| 4,525,522 A | 6/1985 | Turner et al. |
| 4,670,501 A * | 6/1987 | Dymond et al. ............ 524/458 |
| 4,671,883 A | 6/1987 | Connell et al. |
| 4,740,319 A | 4/1988 | Patel et al. |
| 5,164,433 A | 11/1992 | Ricci et al. |
| 5,346,011 A | 9/1994 | Onan et al. |
| 5,372,641 A | 12/1994 | Carpenter |
| 5,425,806 A * | 6/1995 | Doolan et al. ............ 106/203.1 |
| 5,605,872 A | 2/1997 | Engel et al. |
| 5,837,655 A | 11/1998 | Halliday et al. |
| 5,851,958 A | 12/1998 | Halliday et al. |
| 5,913,364 A | 6/1999 | Sweatman |
| 6,167,967 B1 | 1/2001 | Sweatman |
| 6,184,287 B1 * | 2/2001 | Westerman ............ 524/814 |
| 6,197,878 B1 | 3/2001 | Murray et al. |
| 6,234,251 B1 | 5/2001 | Chatterji et al. |
| 6,328,106 B1 | 12/2001 | Griffith et al. |
| 6,401,817 B1 | 6/2002 | Griffith et al. |
| 6,508,306 B1 | 1/2003 | Reddy et al. |
| 6,703,351 B2 | 3/2004 | Stowe, II et al. |
| 6,881,708 B2 | 4/2005 | Reddy et al. |
| 2002/0160919 A1 | 10/2002 | Stowe, II et al. |
| 2004/0063807 A1 | 4/2004 | Wang et al. |
| 2004/0110644 A1 | 6/2004 | Halliday et al. |
| 2004/0132625 A1 | 7/2004 | Halliday et al. |

FOREIGN PATENT DOCUMENTS

| | | |
|---|---|---|
| EP | 0 175 412 A2 | 3/1988 |
| GB | 2074636 A | 11/1981 |
| GB | 2131067 A | 6/1984 |
| GB | 2304754 A | 3/1997 |
| GB | 2351986 A | 1/2001 |
| WO | WO 93/09201 | 5/1993 |

OTHER PUBLICATIONS

C. Stowe, et al., "Laboratory Pore Pressure Transmission Testing of Shale" AADE National Drilling Technical Conference, 2001, pp. 1-10, AADE 01-NC-HO-44.
British Combined Search and Examination Report for United Kingdom Patent Application No. GB 0114390.8, Oct. 15, 2001.

* cited by examiner

*Primary Examiner*—Timothy J. Kugel
(74) *Attorney, Agent, or Firm*—The Morris Law Firm, P.C.; Paula D. Morris

(57) ABSTRACT

Latex additives, methods for treating latex additives, drilling fluid systems, and lost circulation pills comprising the latex additives, the latex additive comprising latex particles having a particle size distribution before aging comprising an average particle diameter of about 1 micron or less; and a quantity of one or more water soluble oxygenated organic molecules comprising two or more oxygen atoms effective to maintain substantially the same particle size distribution before and after freezing the latex additive.

55 Claims, 19 Drawing Sheets